US009364902B1

(12) United States Patent
Ruggiero

(10) Patent No.: US 9,364,902 B1
(45) Date of Patent: Jun. 14, 2016

(54) DRILL PRESS CIRCULAR PATTERN TOOL AND ROUTER CIRCLE CUTTING TOOL ASSEMBLIES

(71) Applicant: Dennis Alan Ruggiero, Folsom, CA (US)

(72) Inventor: Dennis Alan Ruggiero, Folsom, CA (US)

( * ) Notice: Subject to any disclaimer, the term of this patent is extended or adjusted under 35 U.S.C. 154(b) by 266 days.

(21) Appl. No.: 13/975,351

(22) Filed: Aug. 25, 2013

Related U.S. Application Data

(60) Provisional application No. 61/693,730, filed on Aug. 27, 2012.

(51) Int. Cl.
*B23Q 9/00* (2006.01)
*B23B 47/28* (2006.01)
*B23C 3/34* (2006.01)

(52) U.S. Cl.
CPC ............... *B23B 47/287* (2013.01); *B23C 3/34* (2013.01); *B23Q 9/0021* (2013.01); *B23Q 9/0035* (2013.01); *B23Q 9/0042* (2013.01); *B23Q 9/0057* (2013.01); *Y10T 408/557* (2015.01); *Y10T 408/567* (2015.01); *Y10T 409/30644* (2015.01); *Y10T 409/306384* (2015.01)

(58) Field of Classification Search
CPC ............ Y10T 408/567; Y10T 408/557; Y10T 409/306384; Y10T 409/30644; B23Q 9/0021; B23Q 9/0035; B23Q 9/0057; B23Q 9/0042

USPC ......... 408/115 R, 79; 409/178, 179; 144/104, 144/106, 154.5, 136.95
See application file for complete search history.

(56) References Cited

U.S. PATENT DOCUMENTS

| | | | | |
|---|---|---|---|---|
| 3,069,933 A | * | 12/1962 | McCall | 408/109 |
| 3,716,085 A | * | 2/1973 | Wing | 144/144.1 |
| 4,798,506 A | * | 1/1989 | Kulp, Jr. | 409/179 |
| 5,183,373 A | * | 2/1993 | Floyd, Jr. | 409/179 |

* cited by examiner

*Primary Examiner* — Daniel Howell
*Assistant Examiner* — Yasir Diab
(74) *Attorney, Agent, or Firm* — Fish & Richardson P.C.

(57) ABSTRACT

A Drill Press Circular Pattern tool comprises a Table Mount which is attached to the drill press table; a Left Alignment Plate and a Right Alignment Plate; a Slide Plate with Centering Pin; a Lock Down Bolt; mounted on top of the Slide Plate is the Rotation Plate with a Degree Gear. A Router Circle Cutter tool comprises an Alignment Plate with an Alignment Pin and a Slide Plate with one or two Centering Pins; the Slide Plate with measuring surface is mechanically coupled to the Alignment Plate with two Slide Plate Brackets; the Alignment Plate is mechanically coupled to the Router Table with Alignment Plate Mounting Bolts/Nut Knobs; the Slide Plate with Centering Pin(s) attached slides on the Router Table top while attached to the Alignment Plate with the two Slide Plate Brackets.

20 Claims, 61 Drawing Sheets

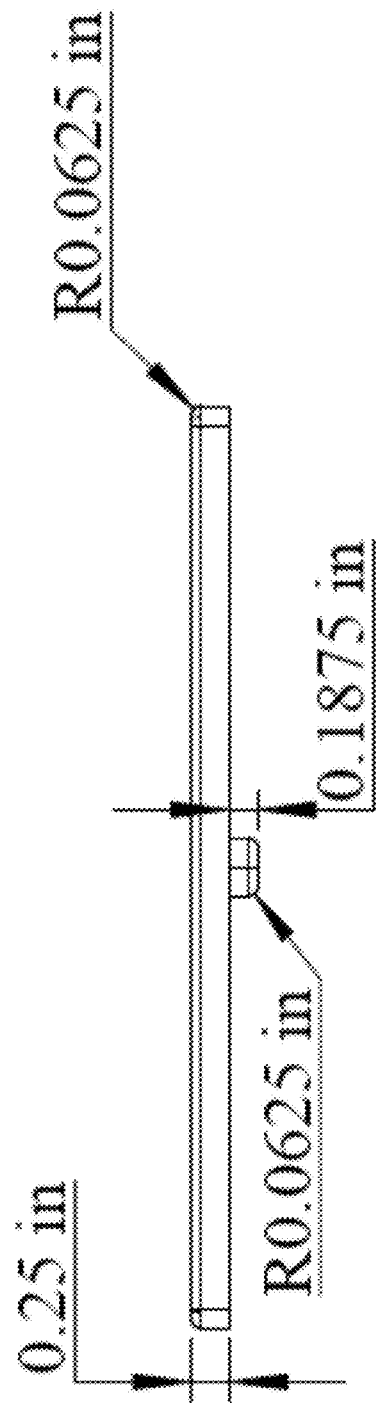

0.125 in

DRILL PRESS CIRCULAR PATTERN TOOL AND ROUTER CIRCLE CUTTING TOOL ASSEMBLIES

FIELD OF THE INVENTION

This invention relates to machine tools.

BRIEF SUMMARY OF THE INVENTIONS

A Drill Press Circular Pattern tool comprises of a Table Mount 210 which is attached to the drill press table; a second alignment plate 206 and a first alignment plate 207 mechanically coupled to the Table Mount; the second alignment plate 206 with measuring surface is mechanically coupled to two radius fixing-pins 201a; the first alignment plate 207 is mechanically coupled to the Table Mount 210; a Slide Plate 208 with work piece-receiving pin 203 attached slides between the second alignment plate 206 and the first alignment plate 207; a Lock Down bolt/nut 205 fits perpendicular through a slot in the Slide Plate 208 and a hole in the Table Mount 210 and mechanically couples the Slide Plate 208 to the Table Mount 210; mounted on top of the Slide Plate 208 is the Rotation Plate 209 with a Degree Gear 204 inserted within and at least one angle-fixing pin 201b; an operator can lower a work piece down onto the work piece-receiving pin 203 using a pre-drilled hole in the work piece; then turn on the drill press to drill holes in precise and repeatable arcs and circular patterns in increments of degrees.

A Router Circle Cutter tool comprises of an Alignment Plate 107 with an radius-setting pin 101 and a Slide Plate 108 with one or two work piece-receiving pins 103; the Slide Plate 108 with measuring surface is mechanically coupled to the Alignment Plate 107 with two Slide Plate Brackets 105; the Alignment Plate 107 is mechanically coupled to the Router Table top 116 with Alignment Plate Mounting Bolts/Nut Knobs 110; the Slide Plate 108 with work piece-receiving pins 103 attached slides on the Router Table top 116 while attached to the Alignment Plate 107 with the two Slide Plate Brackets 105; a Slide Plate 108 stationary rod 106a fits perpendicular through a slot in the Slide Plate 108 and a hole in the Router Table top 116 or the hole in the stationary rod receiving bracket 104 that attaches to the edge of the Router Table top 116, and mechanically couples the Slide Plate 108 to the Router Table top 116; an operator can turn on a router, which is attached to the Router Table top 116 and lower a work piece down onto the work piece-receiving pins 103 using a pre-drilled hole in the work piece to route grooves in precise and repeatable arcs and circular patterns.

BRIEF DESCRIPTION OF THE DRAWINGS

Figure 1:
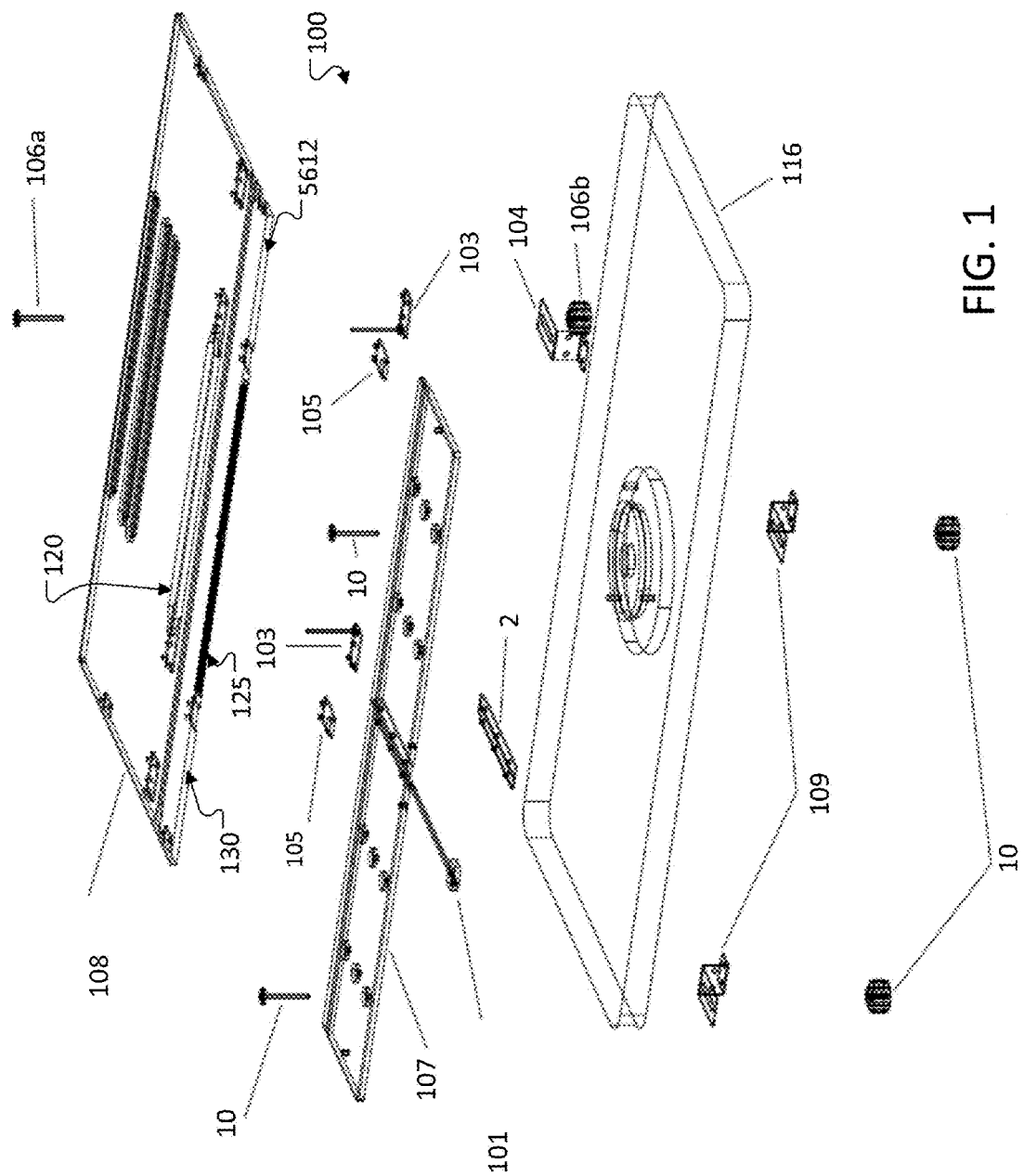

Having thus described the inventions in general terms, reference will now be made to the accompanying set of drawings, which are not necessarily drawn to scale, and wherein:

FIG. 1 illustrates an example diagram of a router circle cutting tool.

Figure 2:
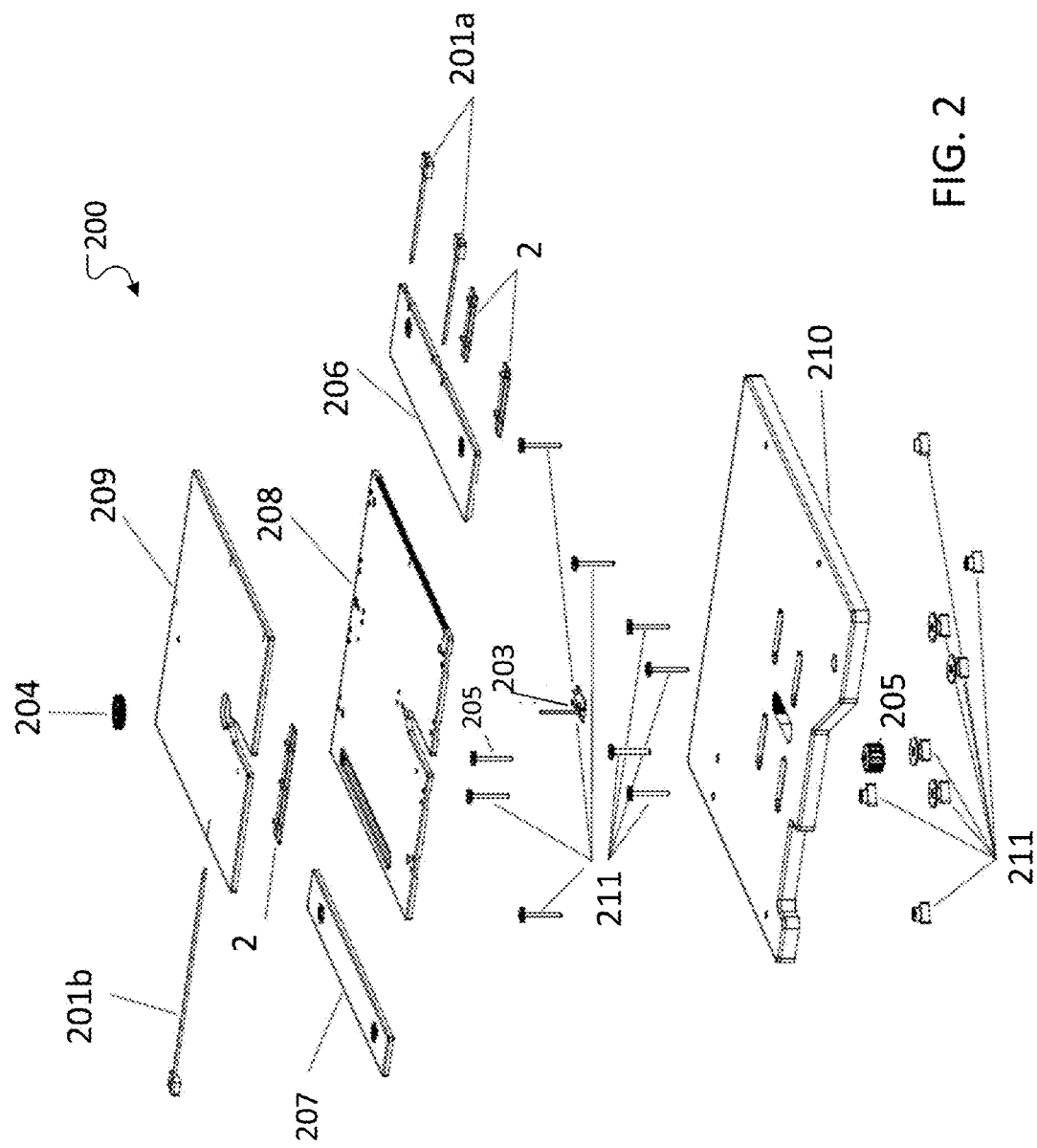

FIG. 2 illustrates an example diagram of a drill press circular pattern tool.

Figure 3:
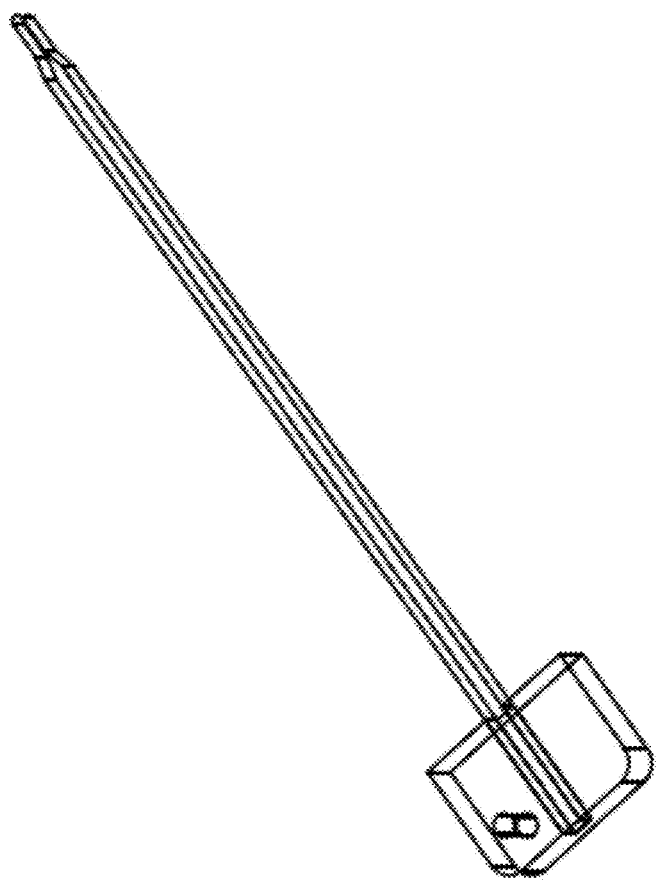

FIG. 3 illustrates a perspective view of an example radius-setting pin, radius-fixing pin, or angle-fixing pin.

Figure 4:
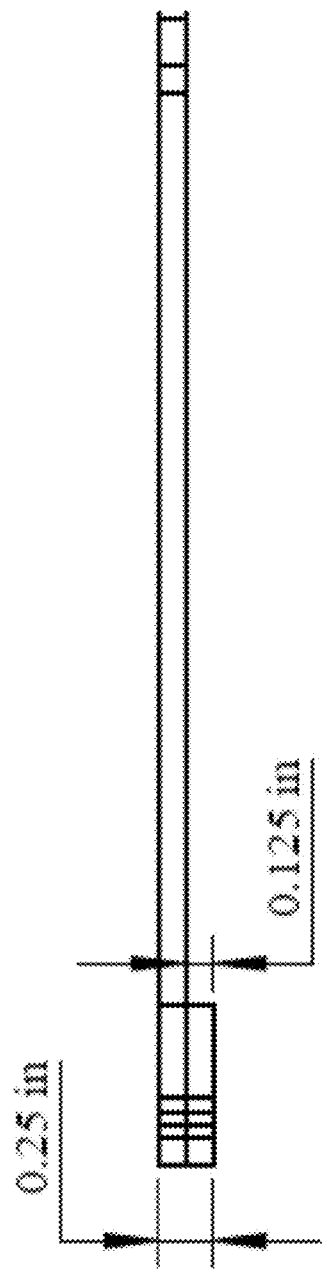

FIG. 4 illustrates a side view of an example radius-setting pin, radius-fixing pin, or angle-fixing pin.

Figure 5A:
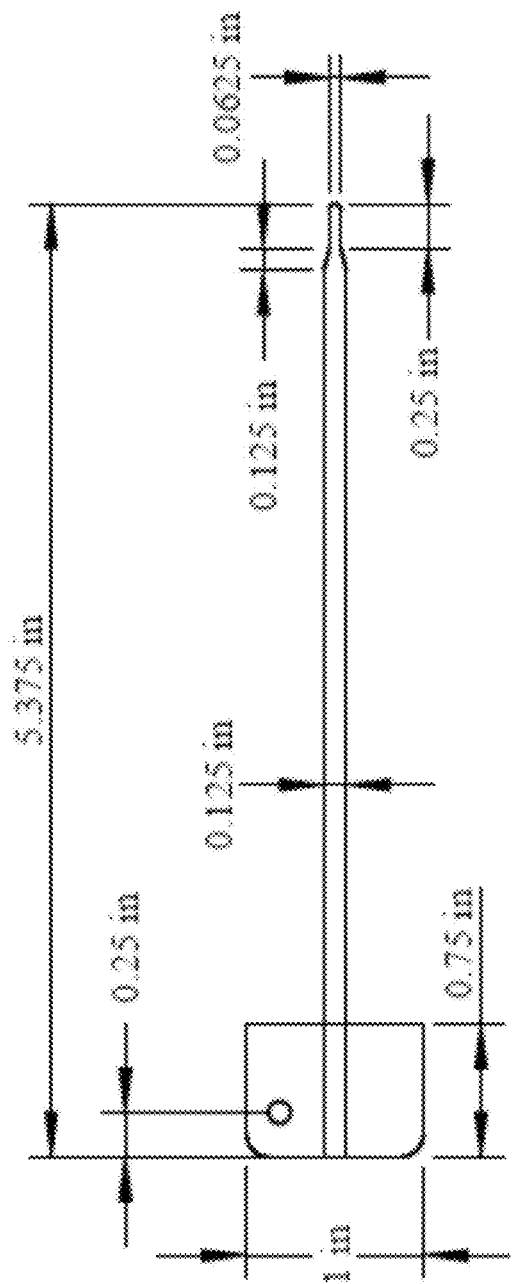
Figure 5B:
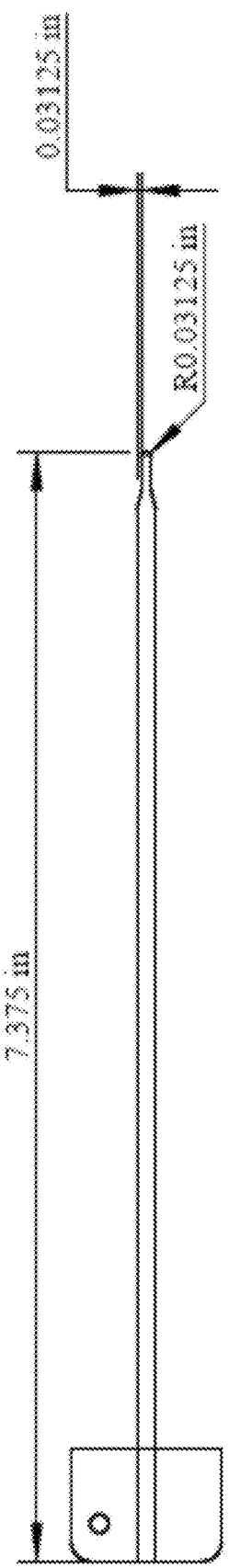
Figure 5C:
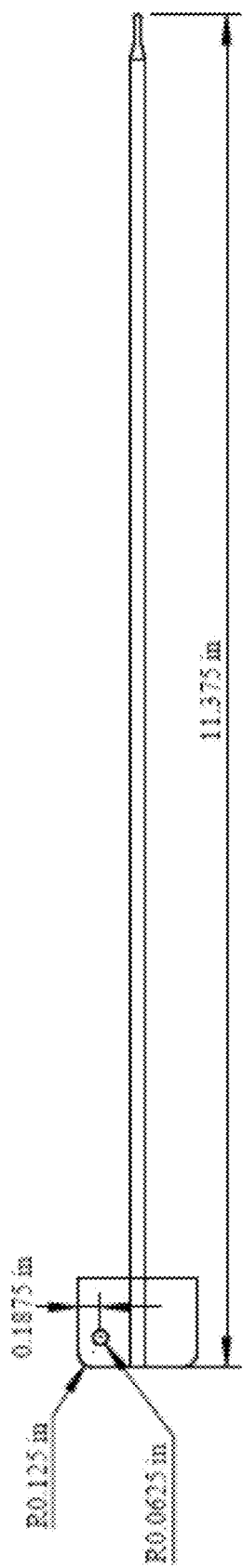

FIGS. 5A to 5C illustrate example top views of an example radius-setting pin, radius-fixing pin, or angle-fixing pin.

Figure 6A:
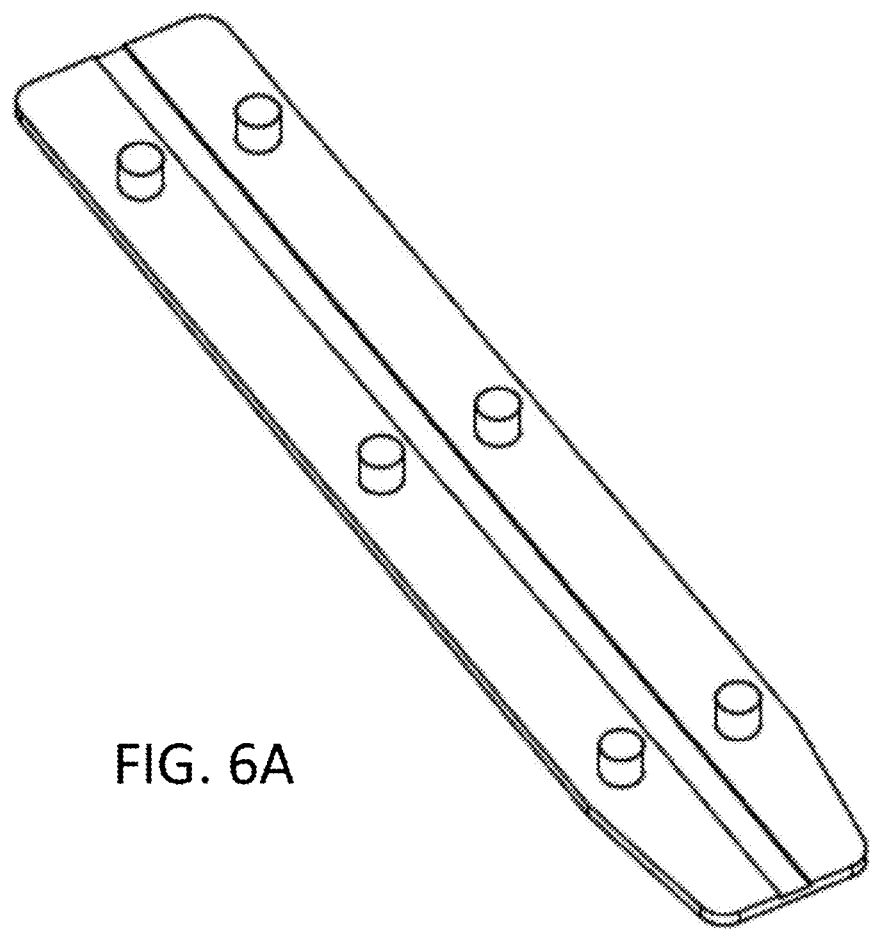
Figure 6B:
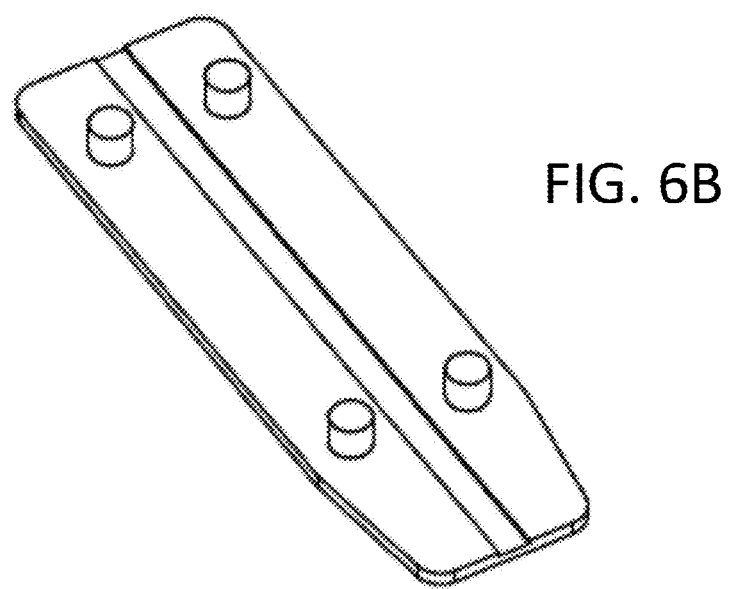

FIGS. 6A and 6B illustrate example perspective views of an example alignment pin cover.

Figure 7A:
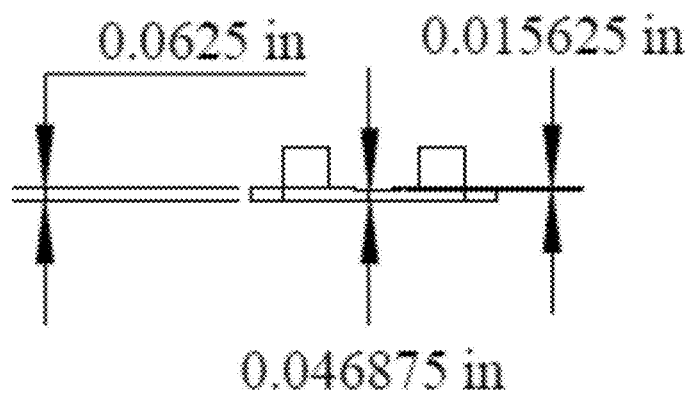
Figure 7B:
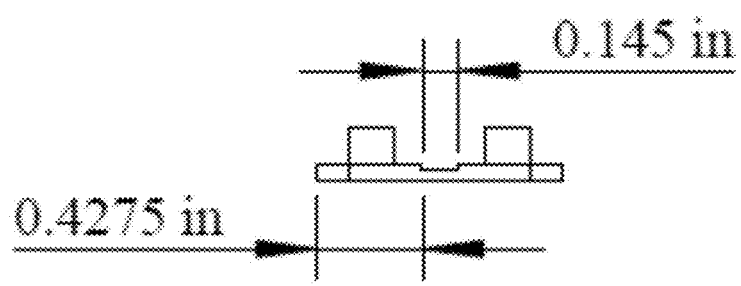

FIGS. 7A and 7B illustrate example front views of an example alignment pin cover.

Figure 8A:
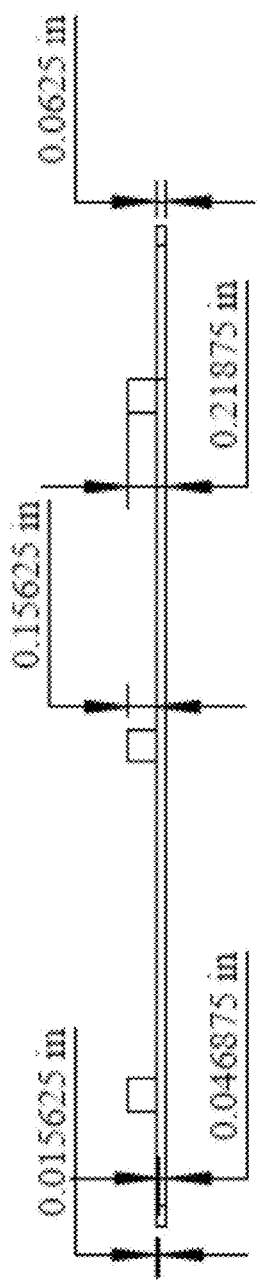
Figure 8B:
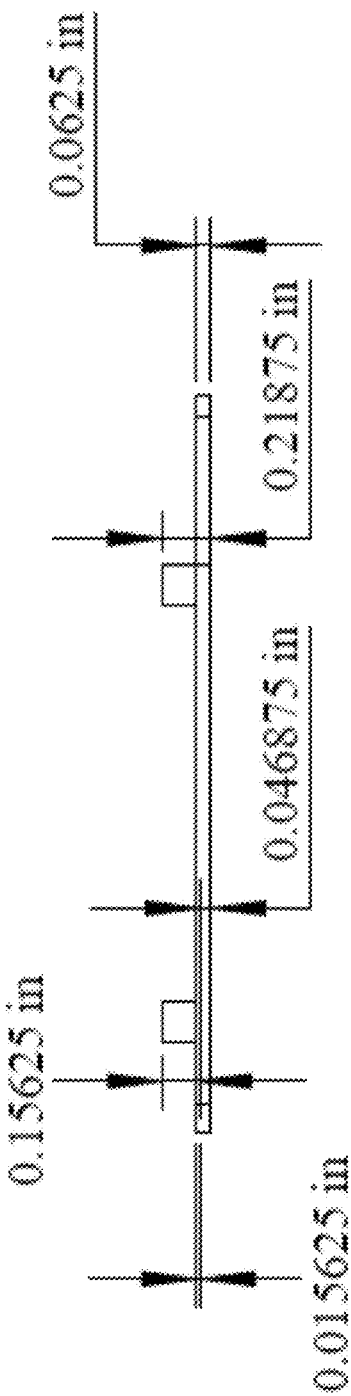

FIGS. 8A and 8B illustrate example side views of an example alignment pin cover.

Figure 9A:
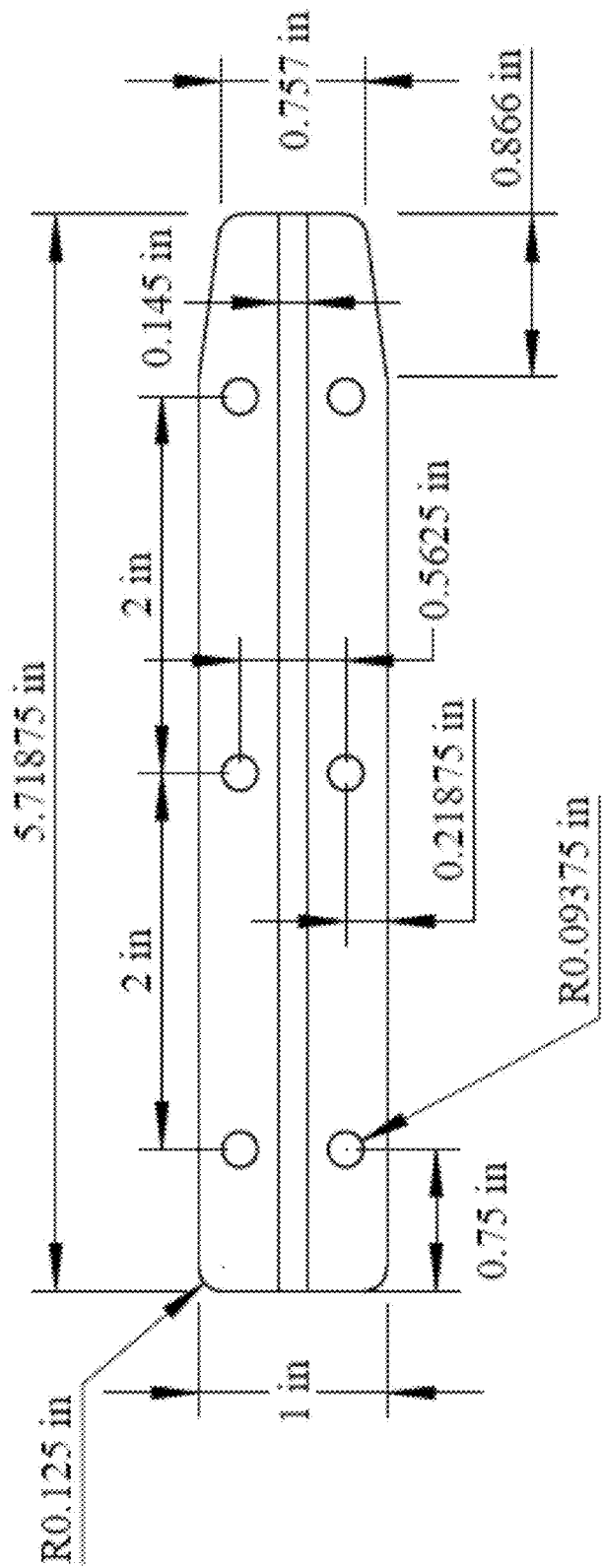
Figure 9B:
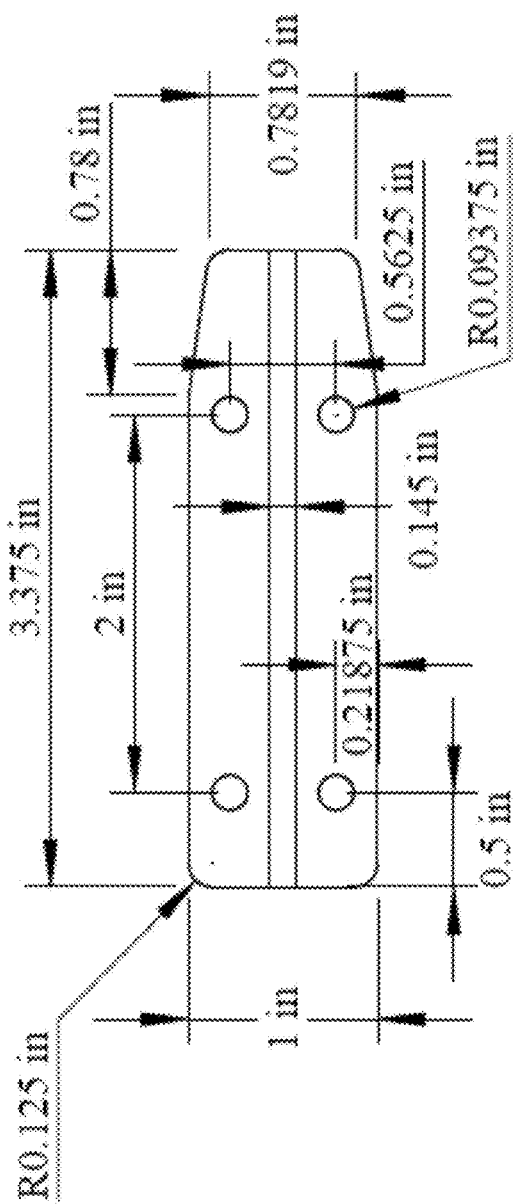

FIGS. 9A and 9B illustrate example top views of an example alignment pin cover.

Figure 10:
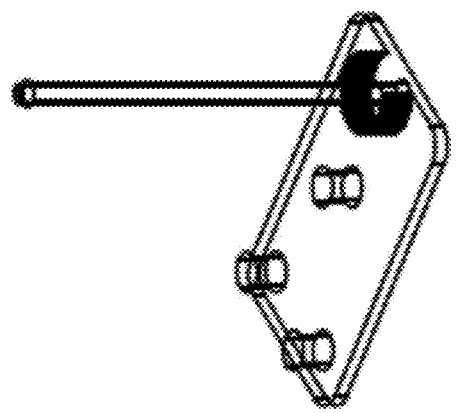

FIG. 10 illustrates a perspective view of an example work piece receiving pin.

Figure 11:
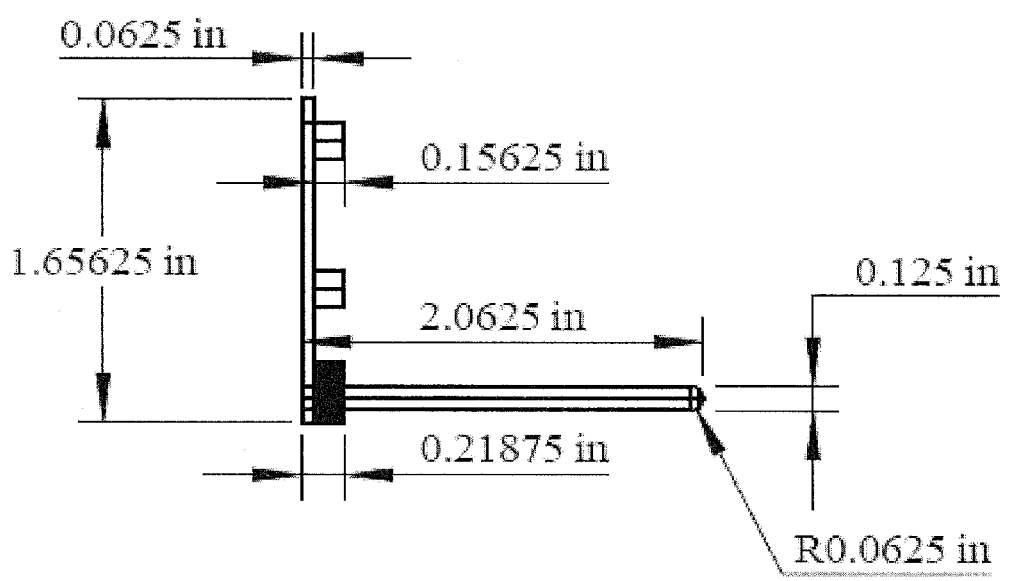

FIG. 11 illustrates a side view of an example work piece receiving pin.

Figure 12:
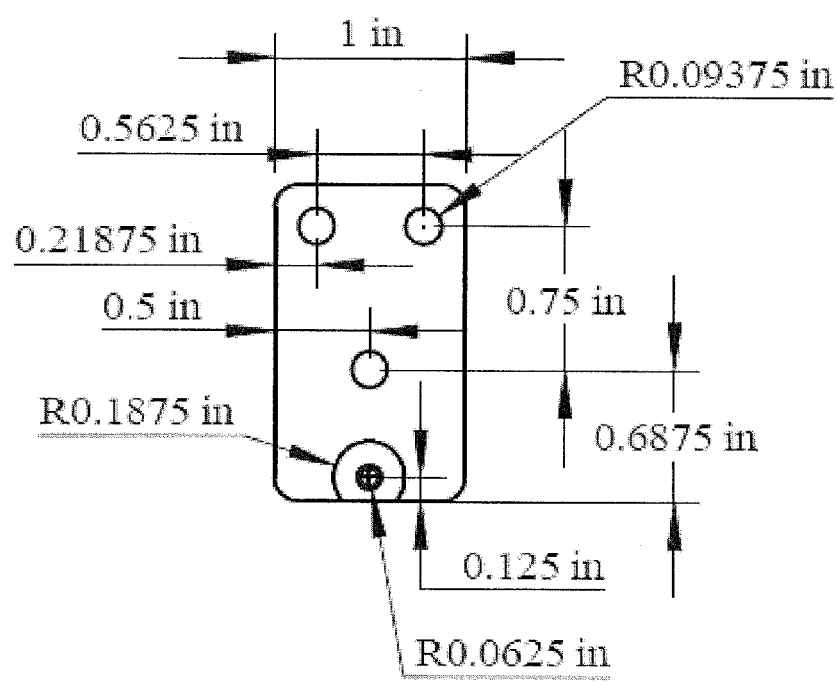

FIG. 12 illustrates a top view of an example work piece receiving pin.

Figure 13:
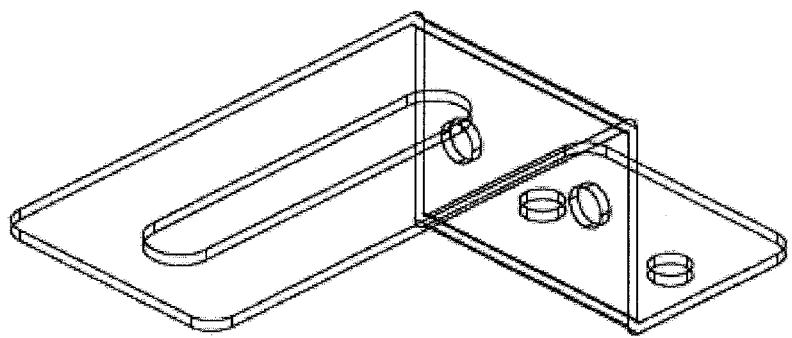

FIG. 13 illustrates a perspective view of an example stationary rod-receiving bracket.

Figure 14:
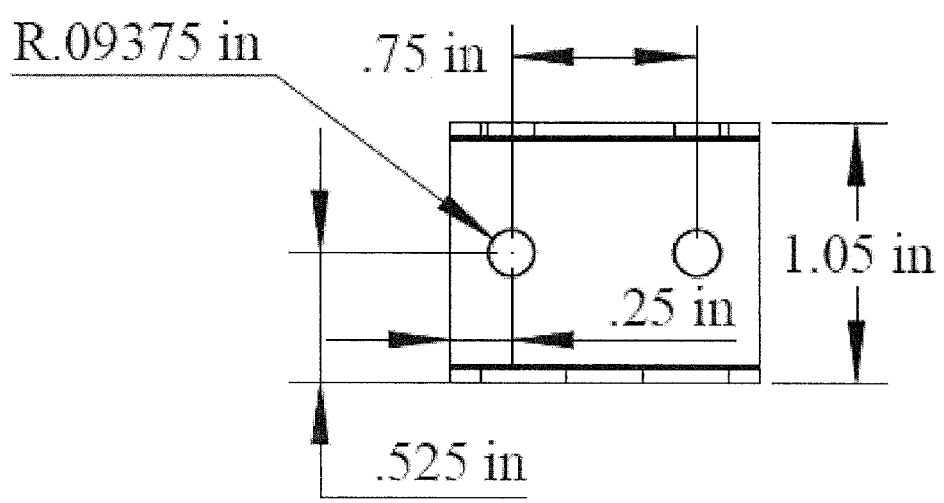

FIG. 14 illustrates a front view of an example stationary rod-receiving bracket.

Figure 15:
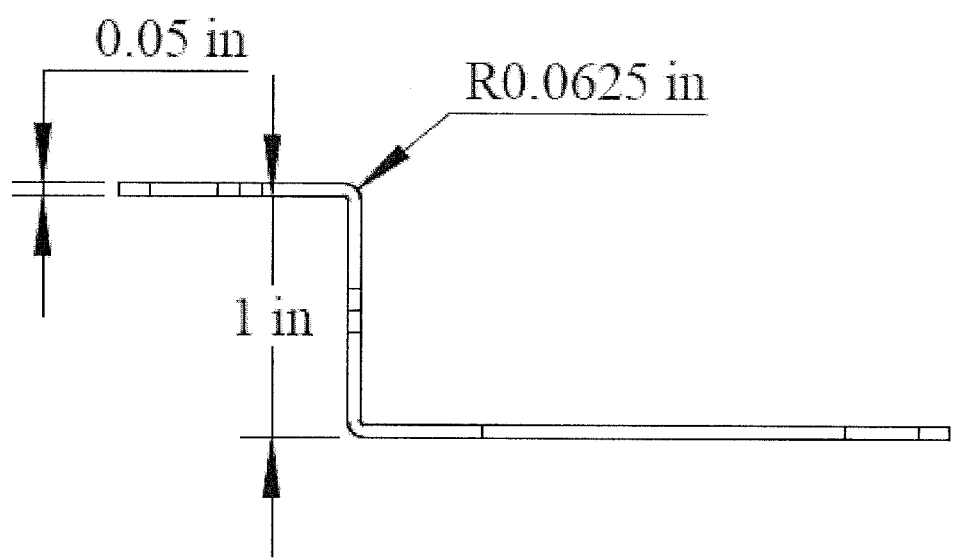

FIG. 15 illustrates a side view of an example stationary rod-receiving bracket.

Figure 16:
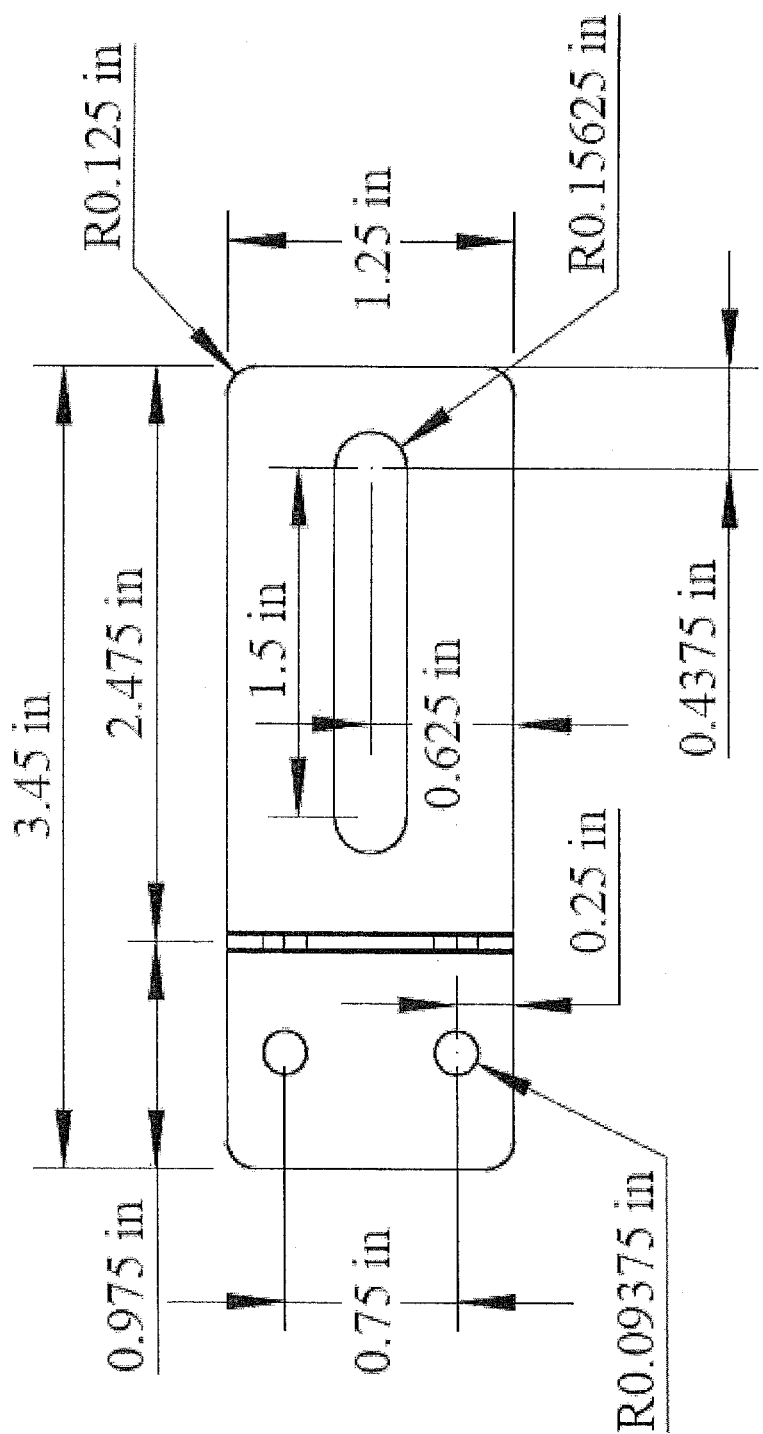

FIG. 16 illustrates a top view of an example stationary rod-receiving bracket.

Figure 17:
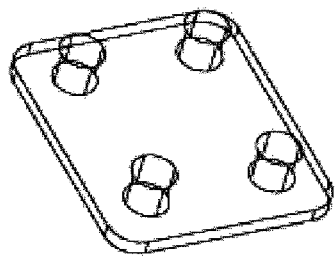

FIG. 17 illustrates a perspective view of an example plate attachment bracket.

Figure 18:
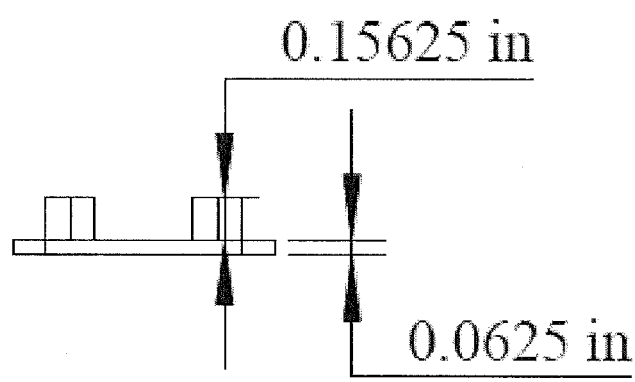

FIG. 18 illustrates a side view of an example plate attachment bracket.

Figure 19:
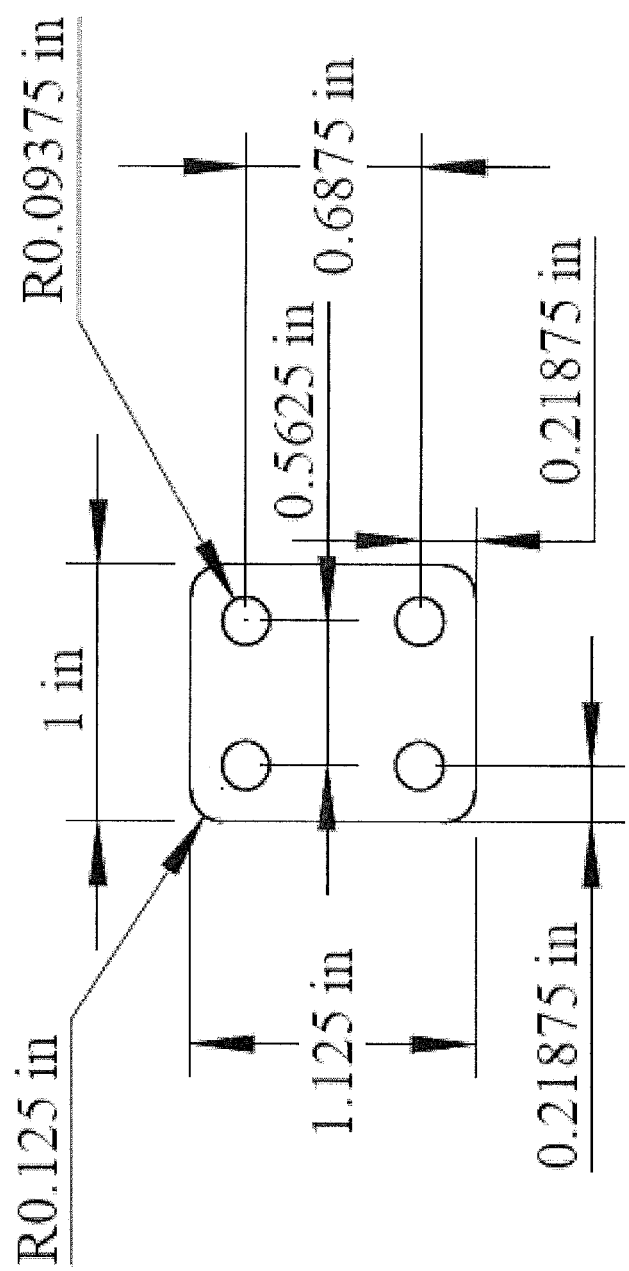

FIG. 19 illustrates a top view of an example plate attachment bracket.

Figure 20:
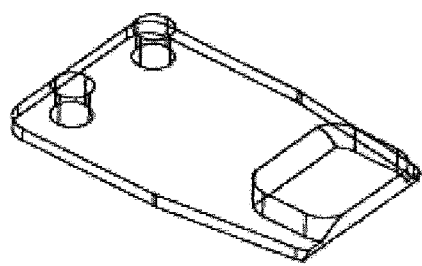

FIG. 20 illustrates a perspective view of an example slide plate bracket.

Figure 21:
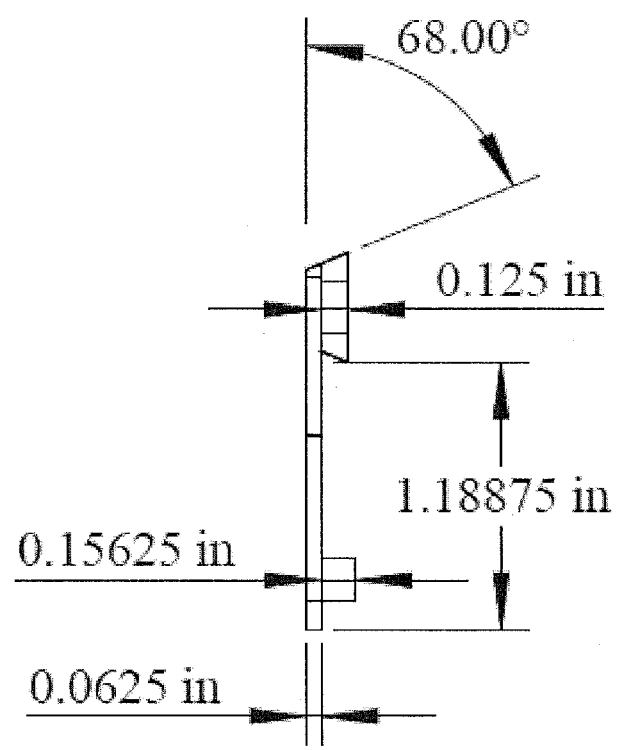

FIG. 21 illustrates a side view of an example slide plate bracket.

Figure 22:
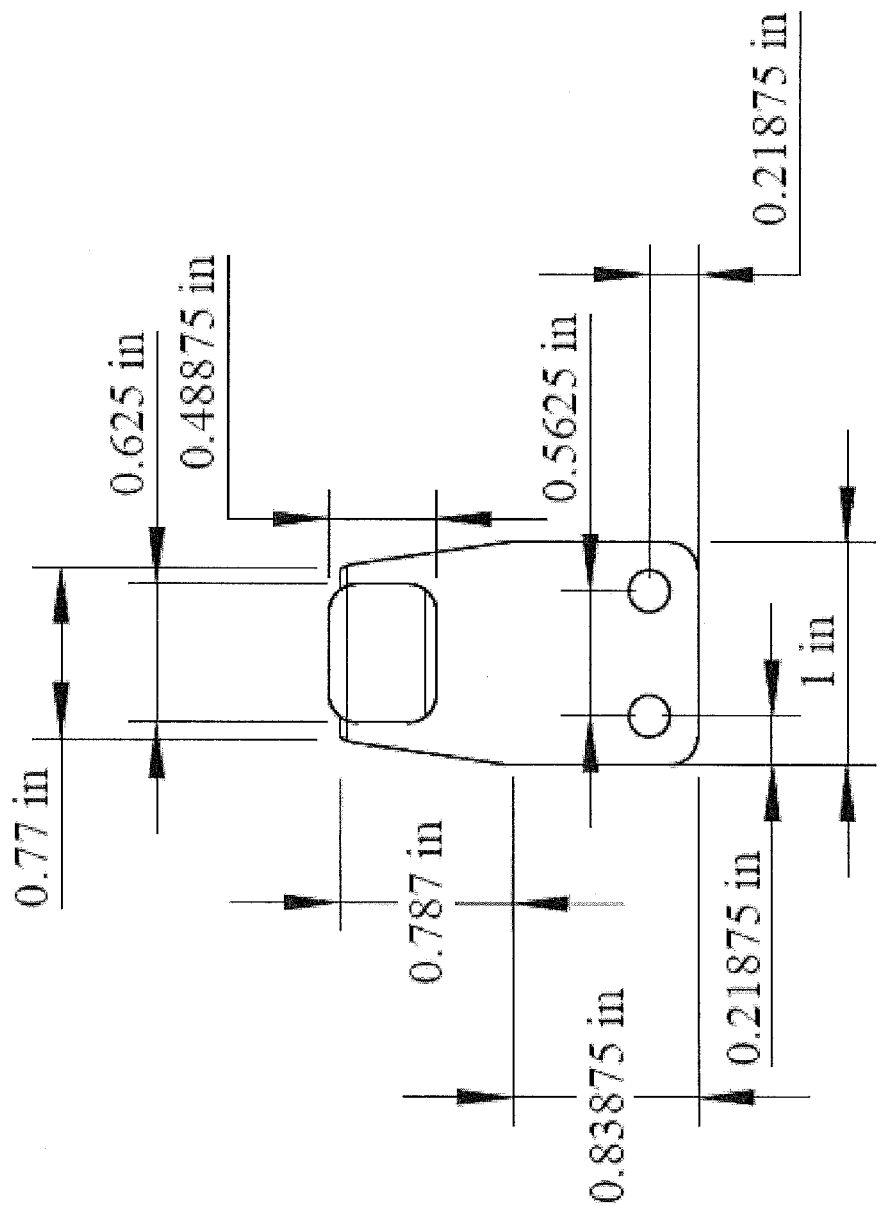

FIG. 22 illustrates a top view of an example slide plate bracket.

Figure 23:
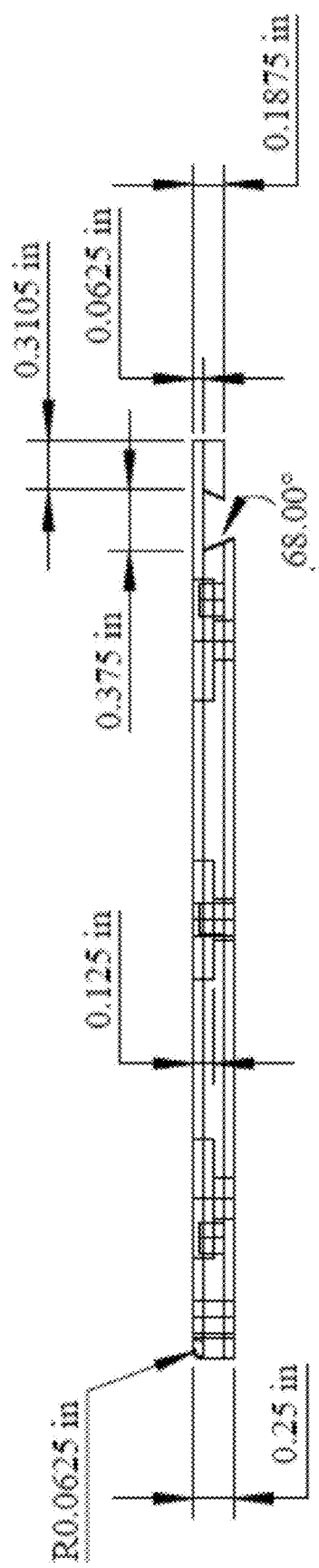

FIG. 23 illustrates a side view of an example alignment plate.

Figure 24:
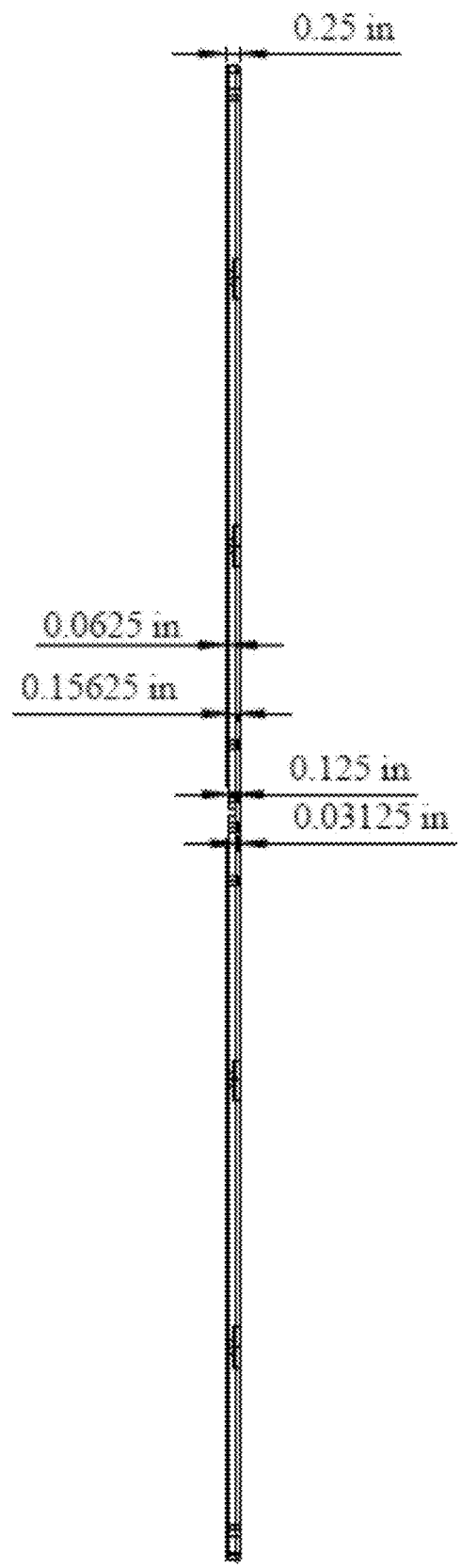

FIG. 24 illustrates a side view of an example alignment plate.

Figure 25:
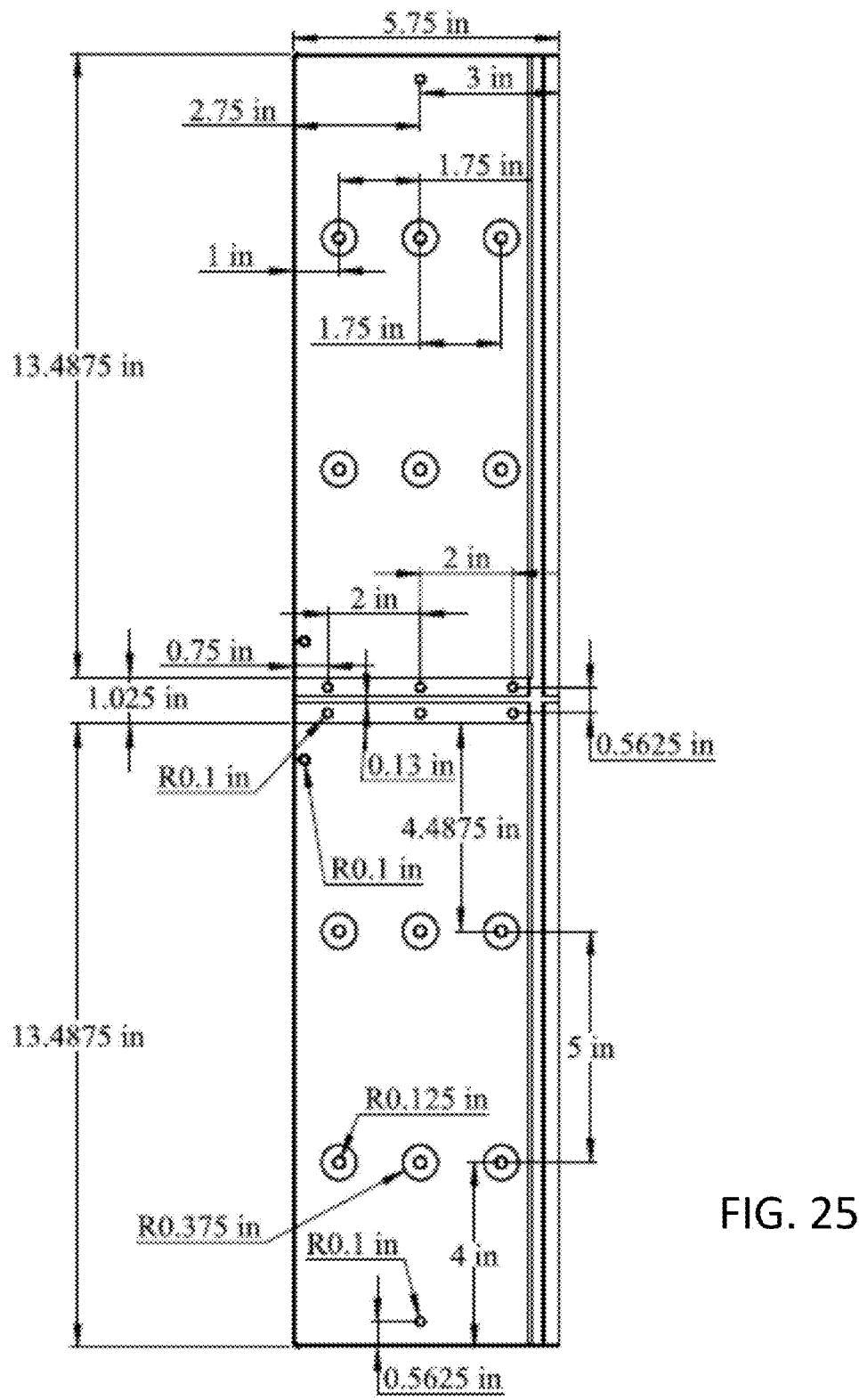

FIG. 25 illustrates a top view of an example alignment plate.

Figure 26:
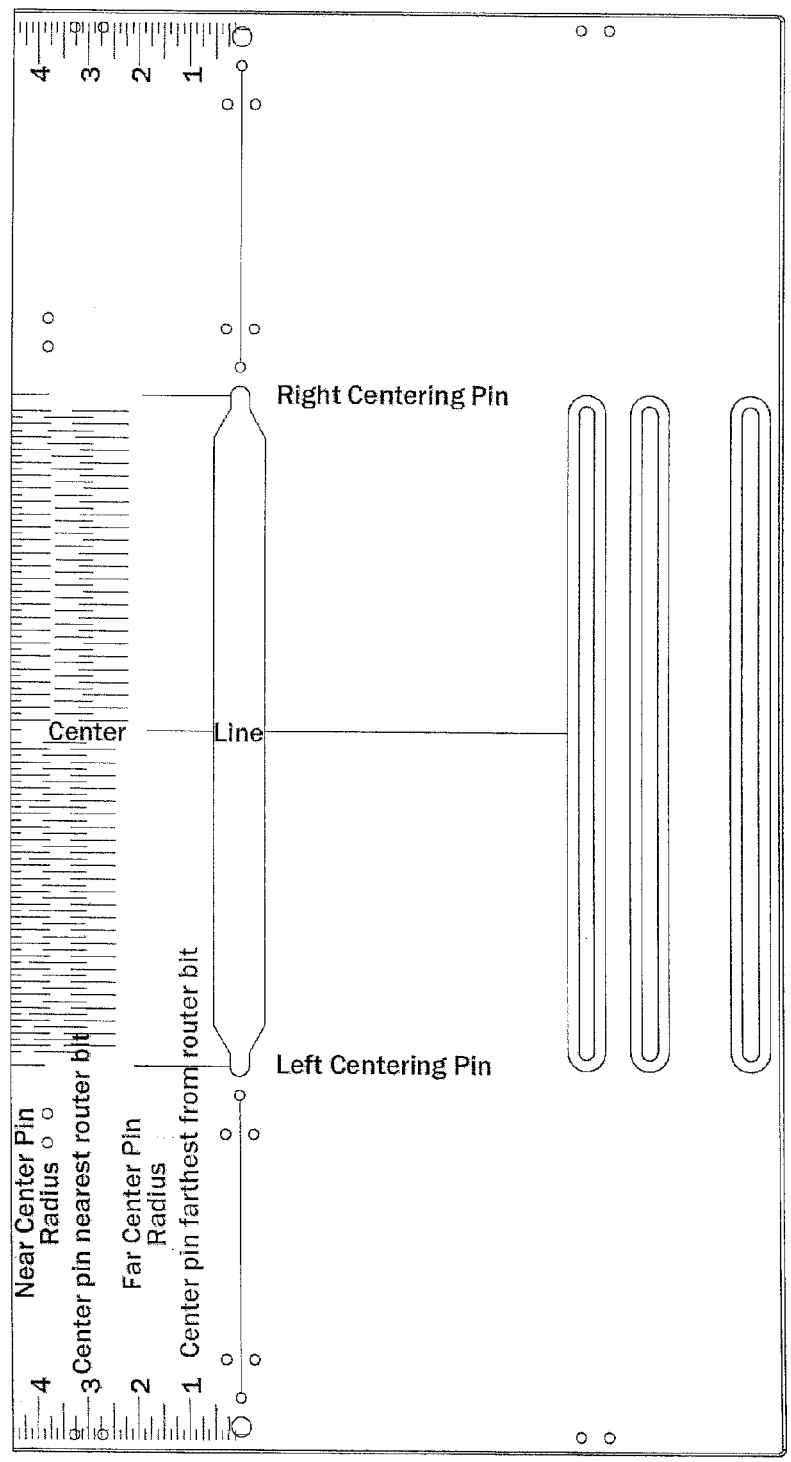

FIG. 26 illustrates an example slide plate.

Figure 27:
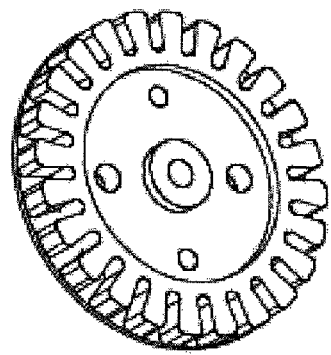

FIG. 27 illustrates a perspective view of an example degree gear.

Figure 28:
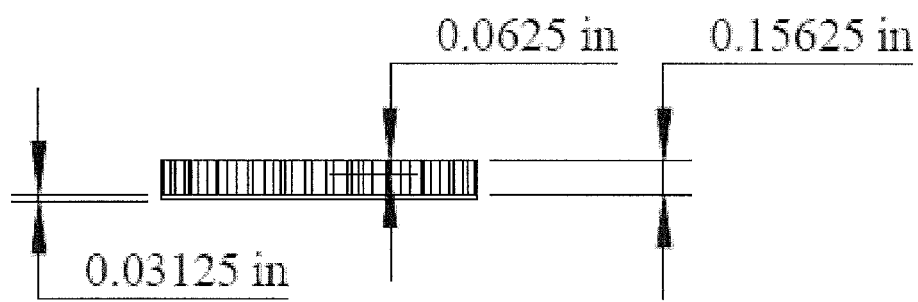

FIG. 28 illustrates a side view of an example degree gear.

Figure 29:
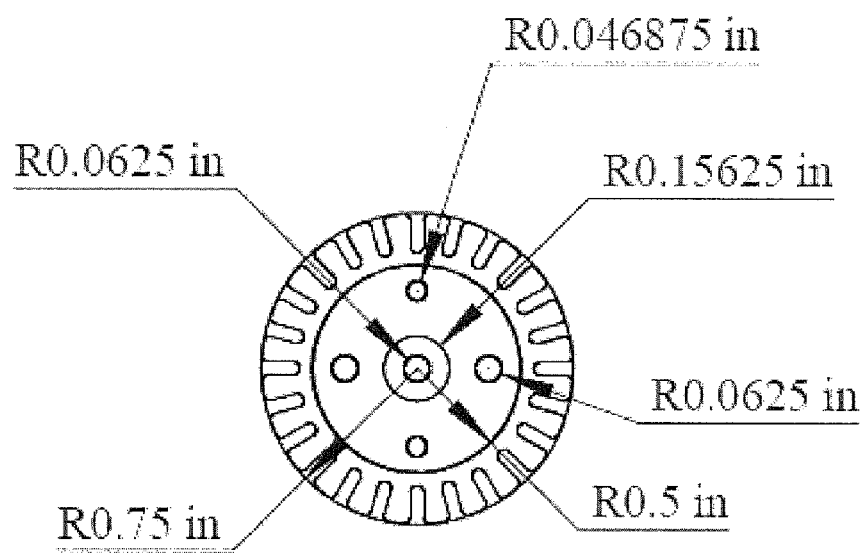

FIG. 29 illustrates a top view of an example degree gear.

Figure 30:
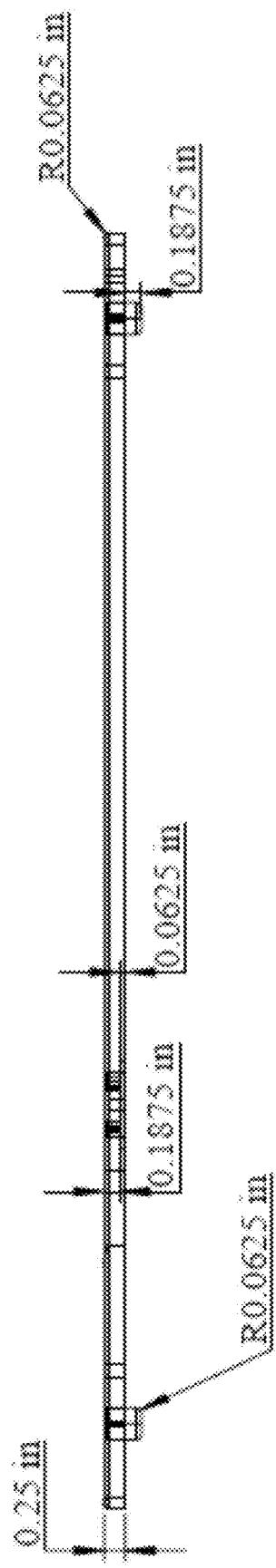

FIG. 30 illustrates a side view of an example rotation plate.

Figure 31:
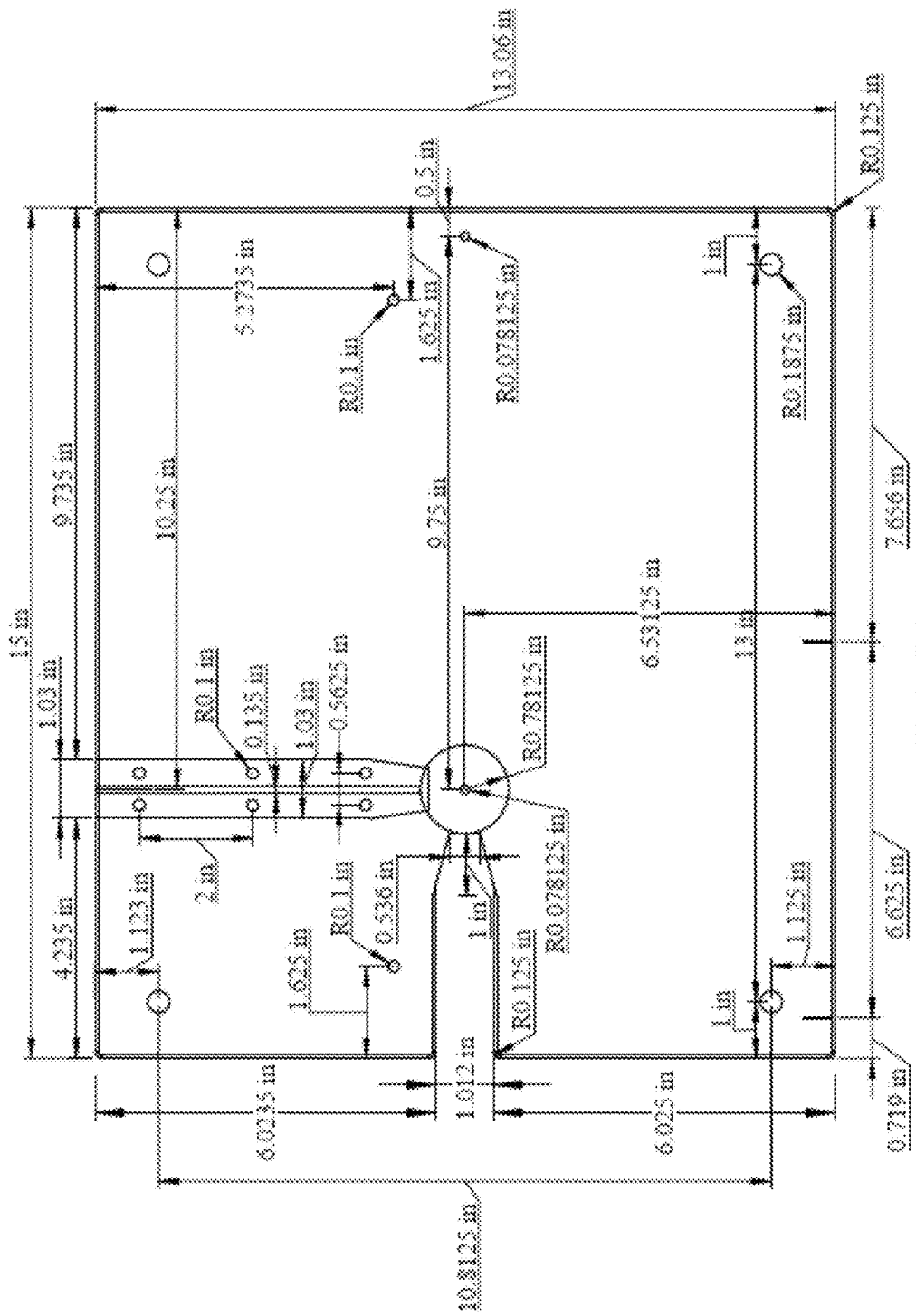

FIG. 31 illustrates a top view of an example rotation plate.

Figure 32:
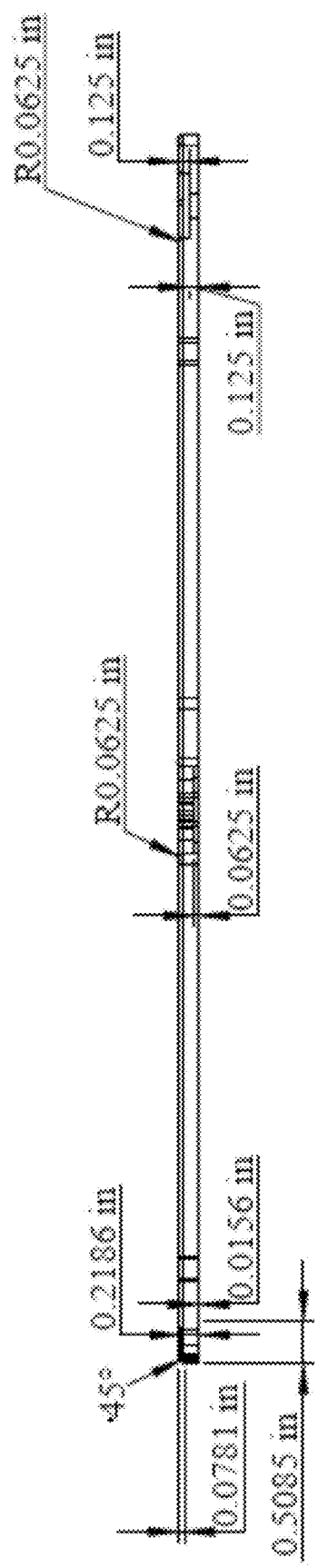

FIG. 32 illustrates a front view of an example slide plate.

Figure 33:
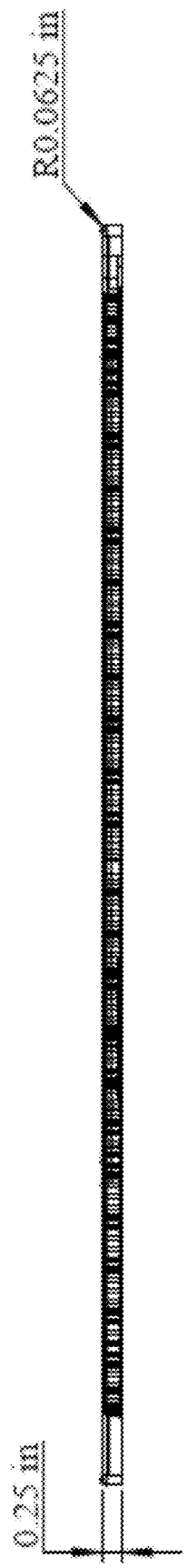

FIG. 33 illustrates a side view of an example slide plate.

Figure 34:
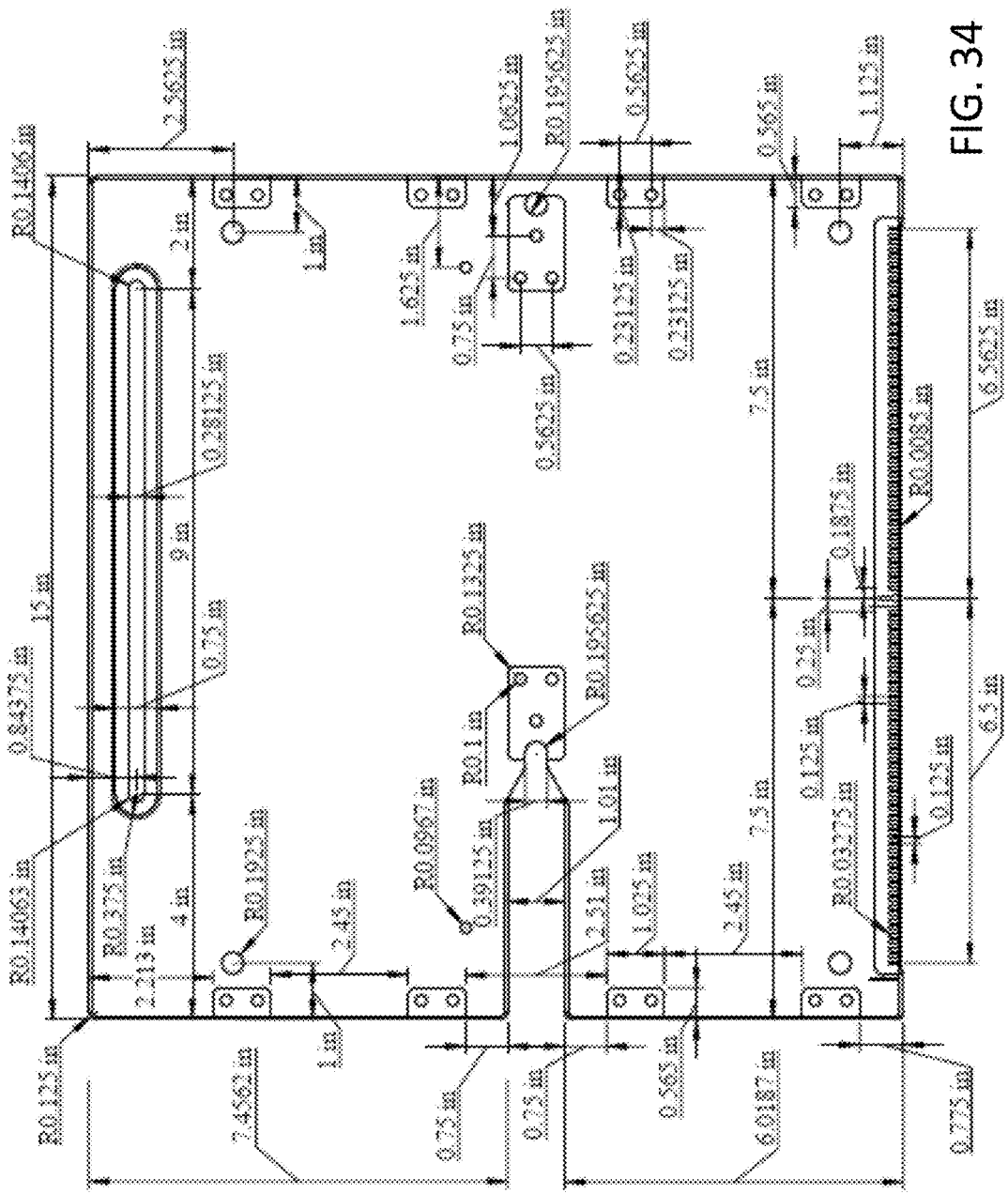

FIG. 34 illustrates a top view of an example slide plate.

Figure 35:
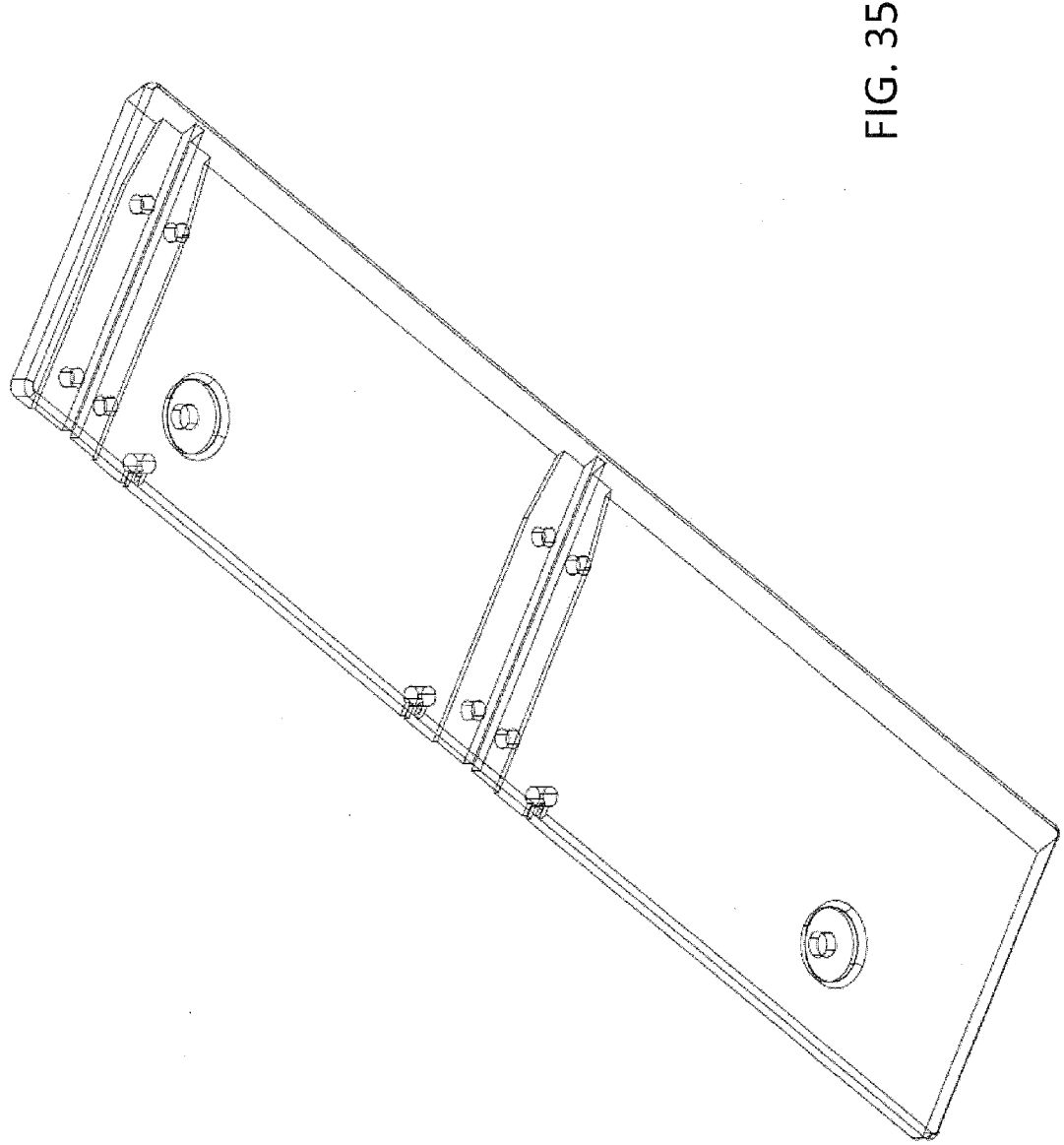

FIG. 35 illustrates a perspective view of an example second alignment plate.

Figure 36:
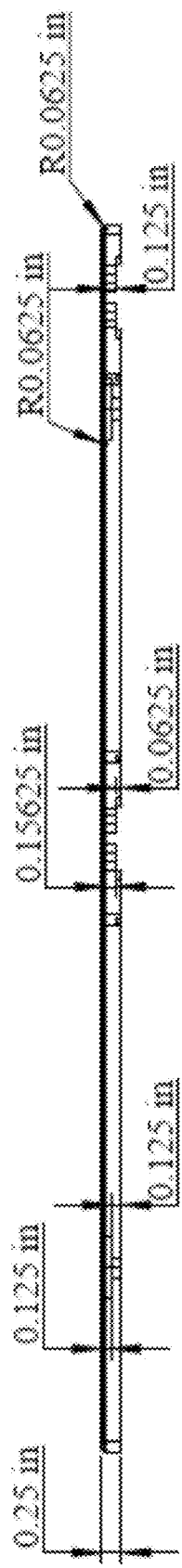

FIG. 36 illustrates a side view of an example second alignment plate.

Figure 37:
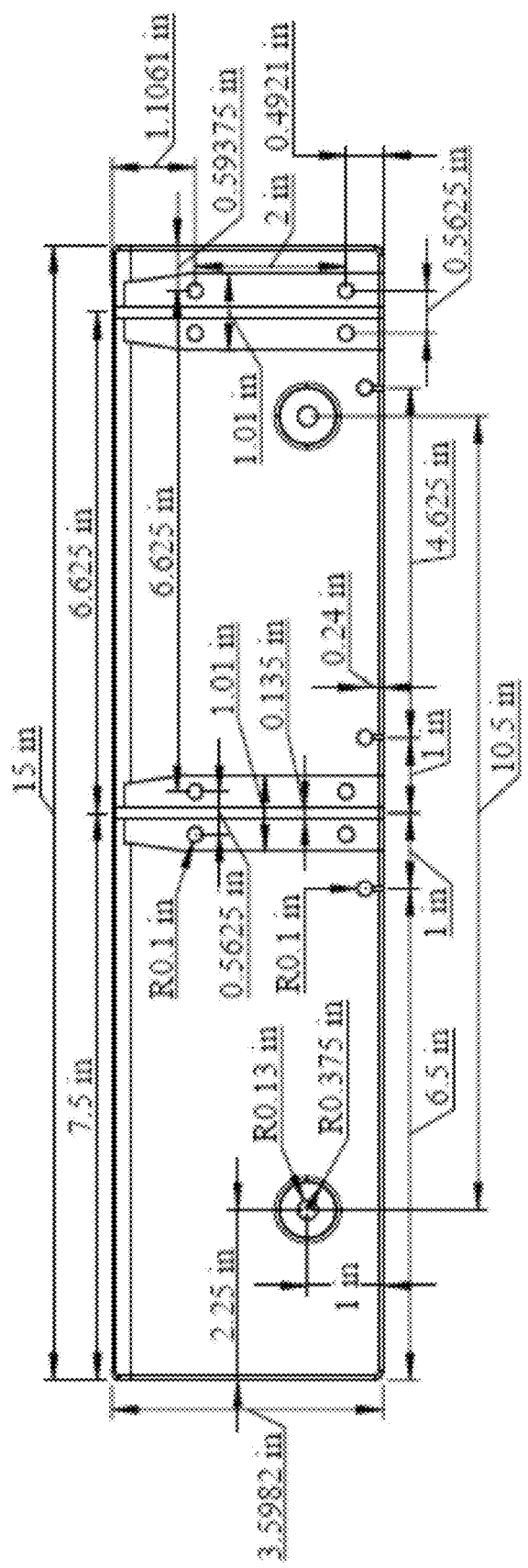

FIG. 37 illustrates a bottom view of an example second alignment plate.

Figure 38:
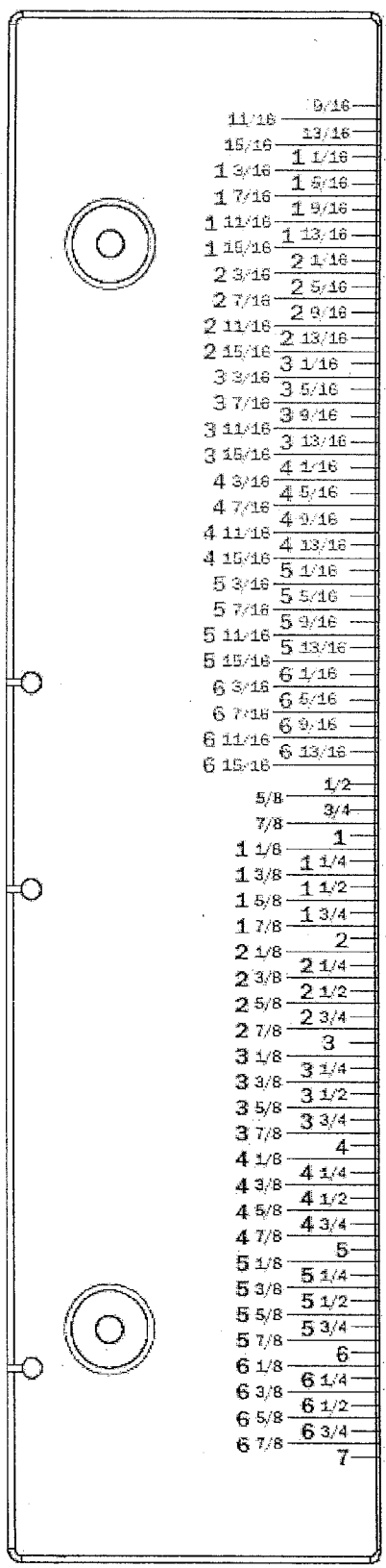

FIG. 38 illustrates a top view of an example second alignment plate.

Figure 39:
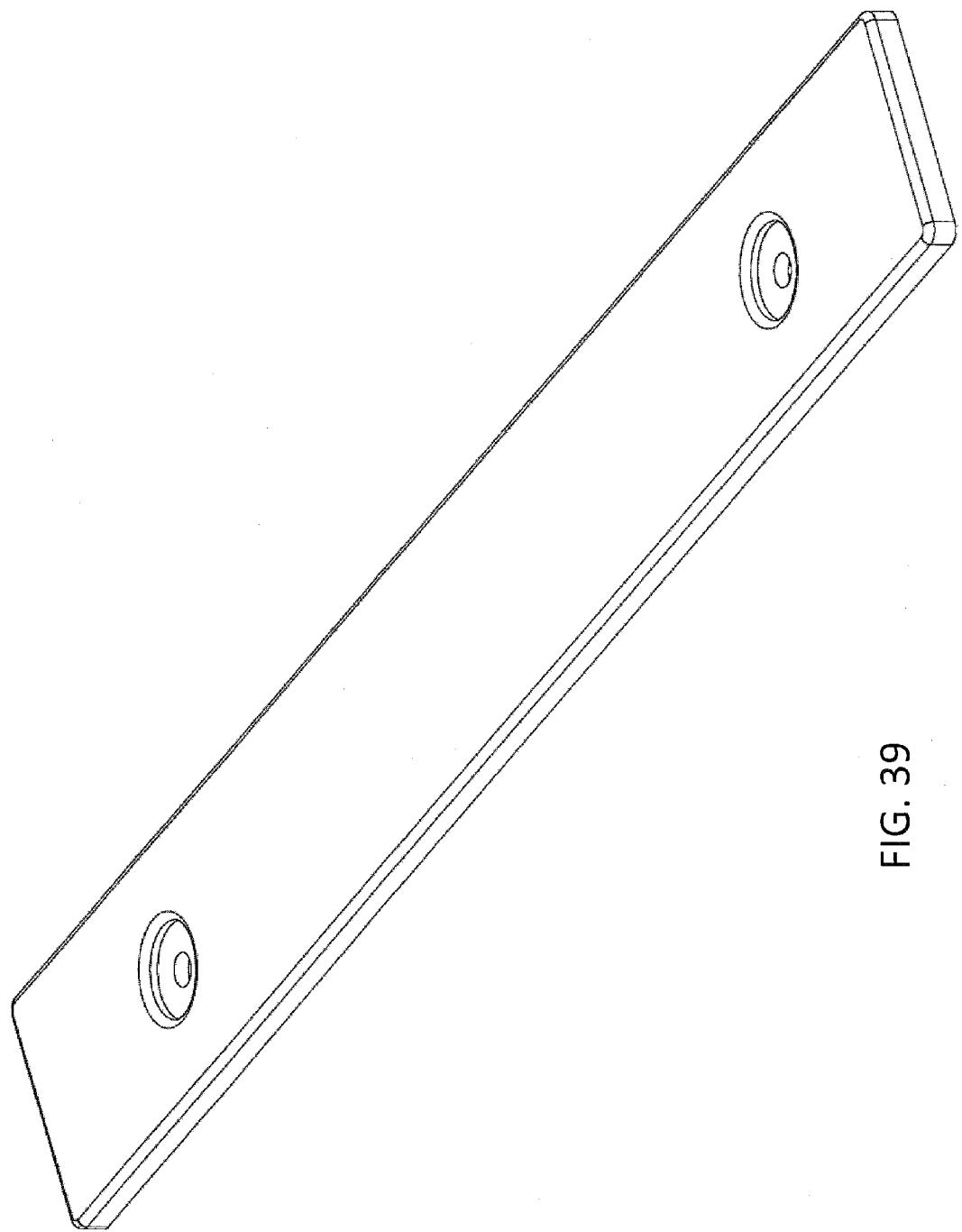

FIG. 39 illustrates a perspective view of an example first alignment plate.

Figure 40:
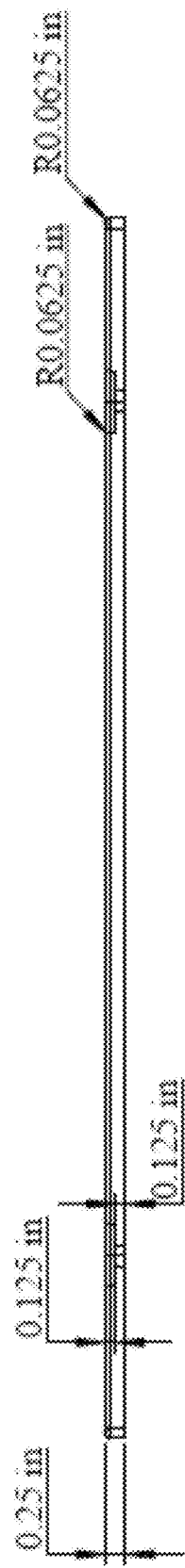

FIG. 40 illustrates a side view of an example first alignment plate.

Figure 41:
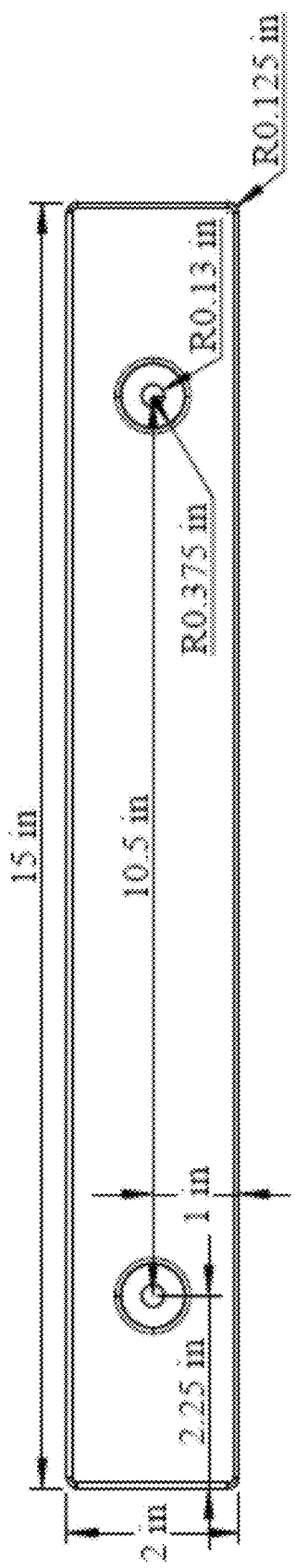

FIG. 41 illustrates a top view of an example first alignment plate.

Figure 42:
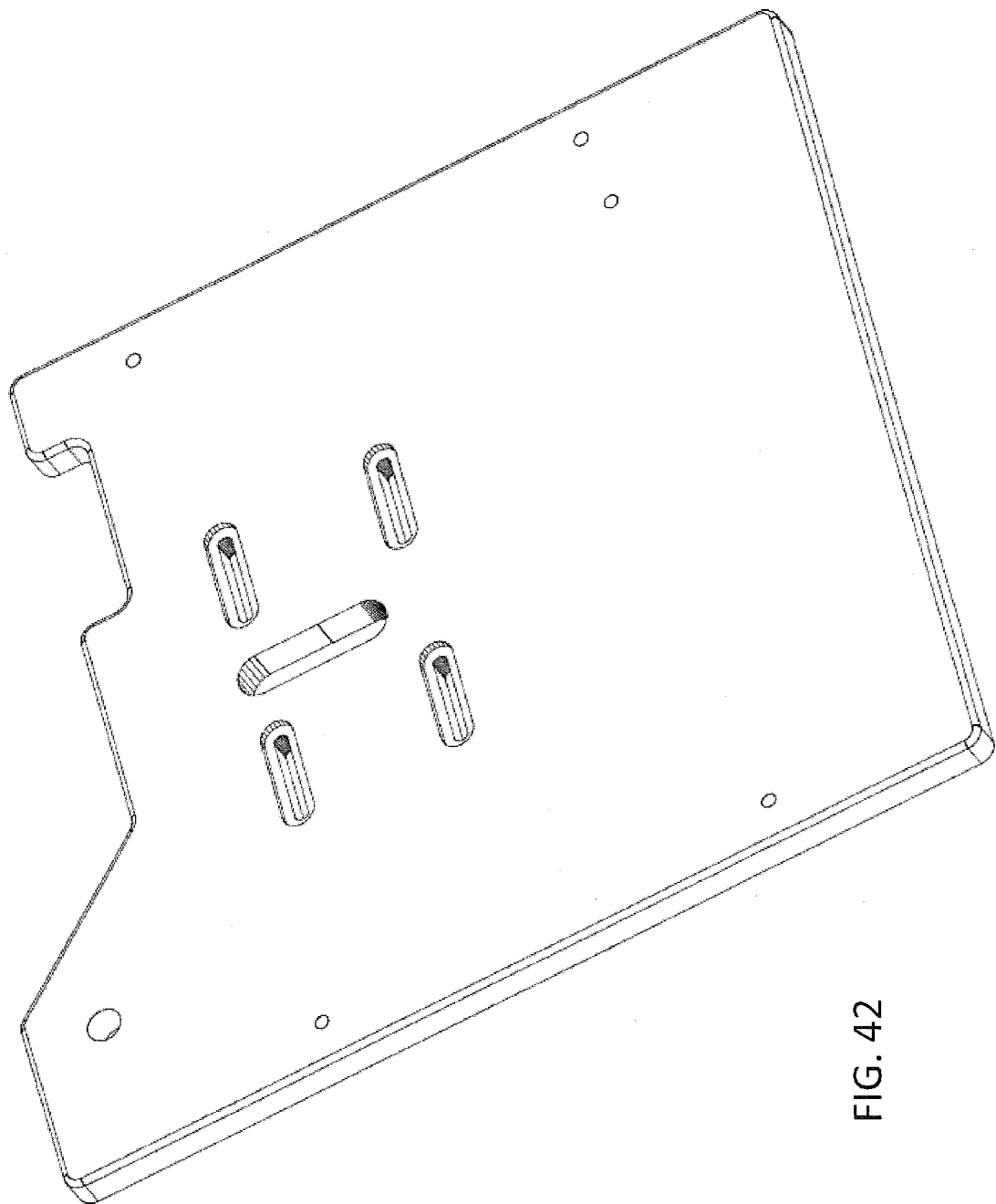

FIG. 42 illustrates a perspective view of an example table mount.

Figure 43:
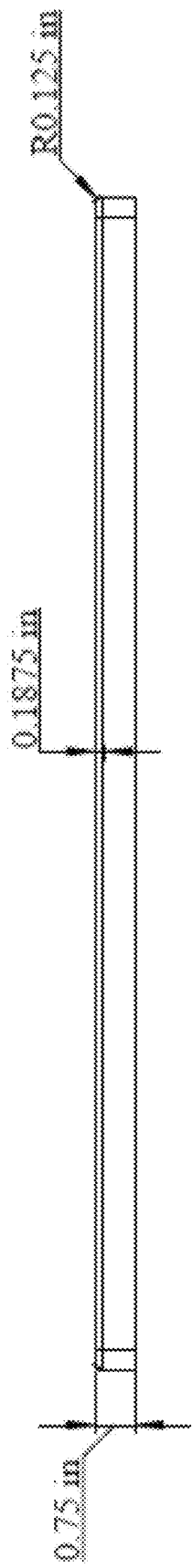

FIG. 43 illustrates a side view of an example table mount.

Figure 44:
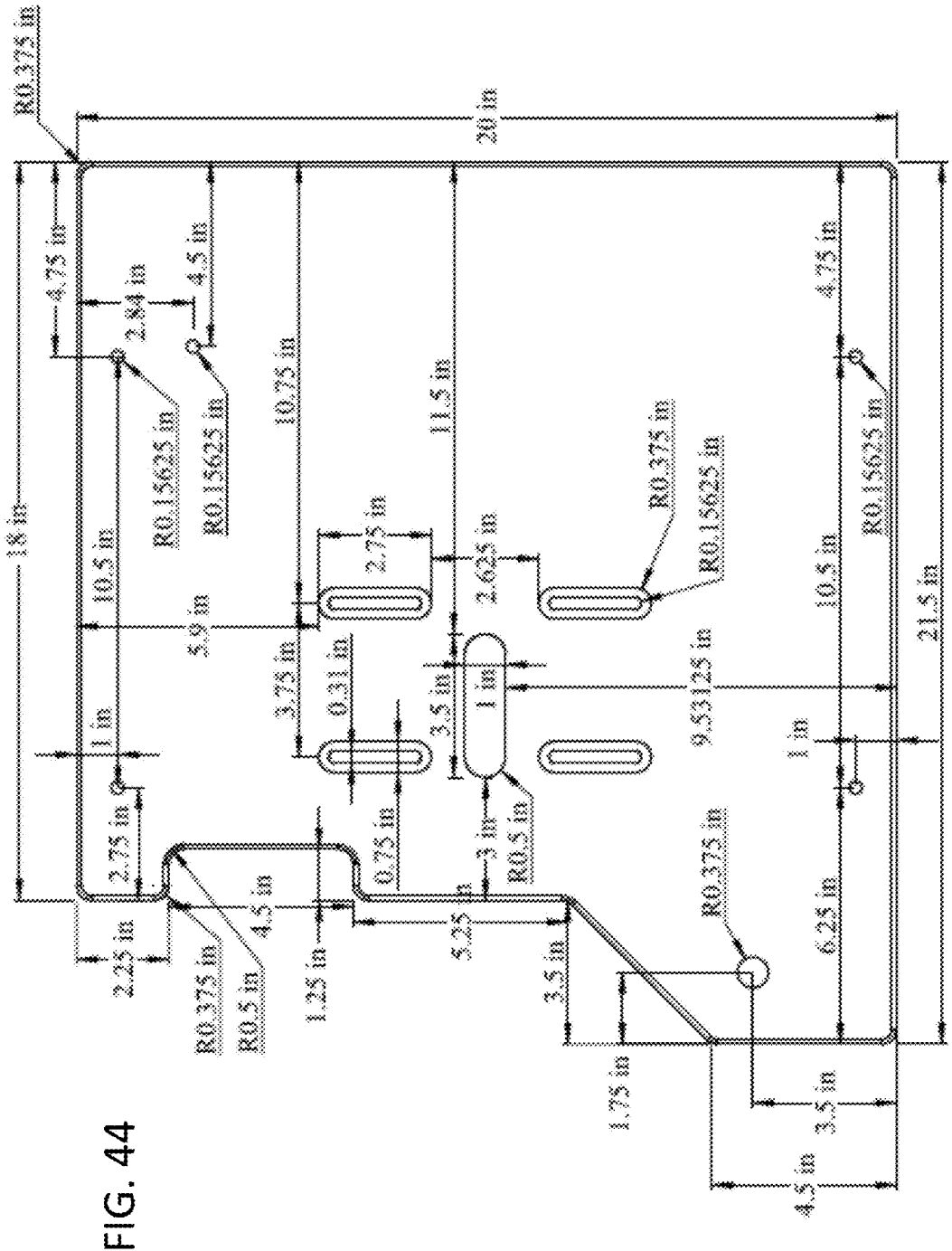

FIG. 44 illustrates a top view of an example table mount.

Figure 45:
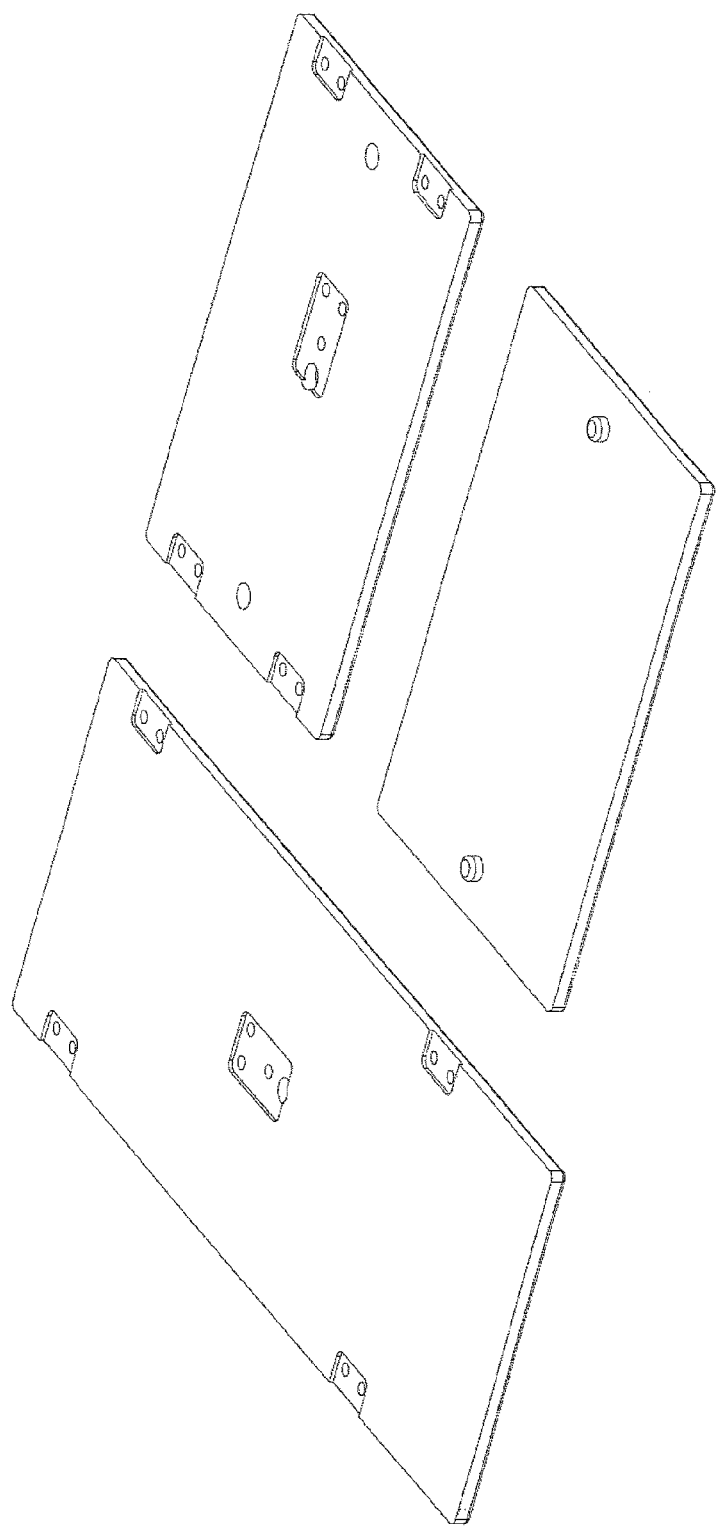

FIG. 45 illustrates bottom perspective views of example extension plates.

Figure 46A:
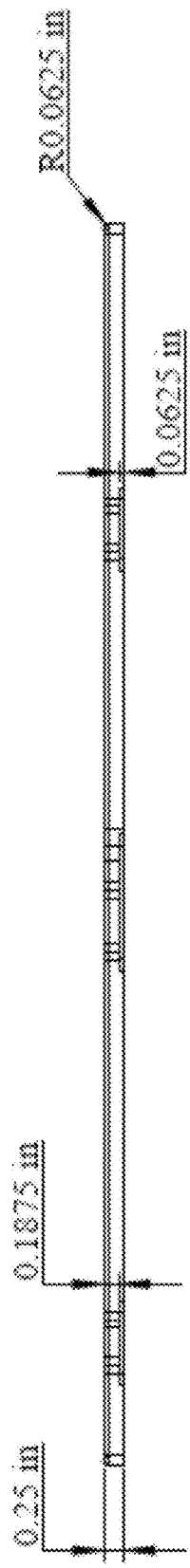
Figure 46B:
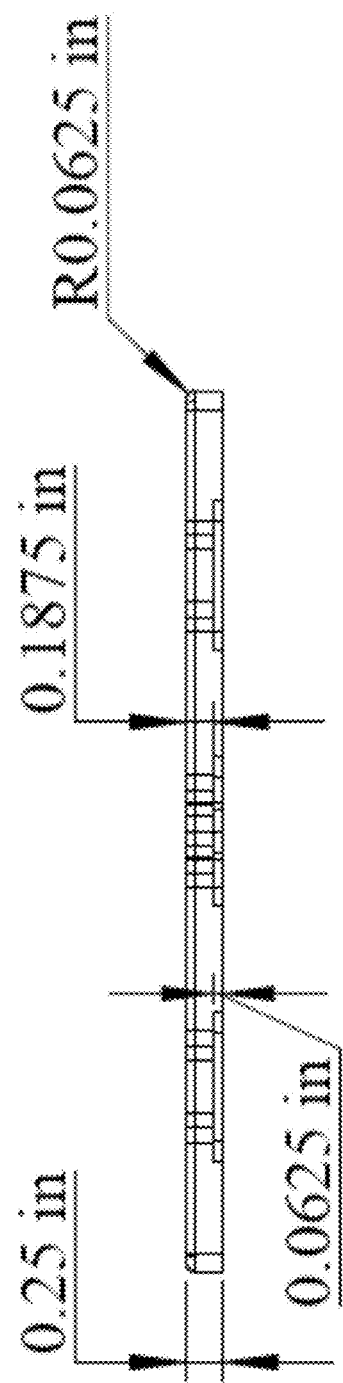

FIGS. 46A and 46C illustrate side views of example extension plates.

Figure 47:
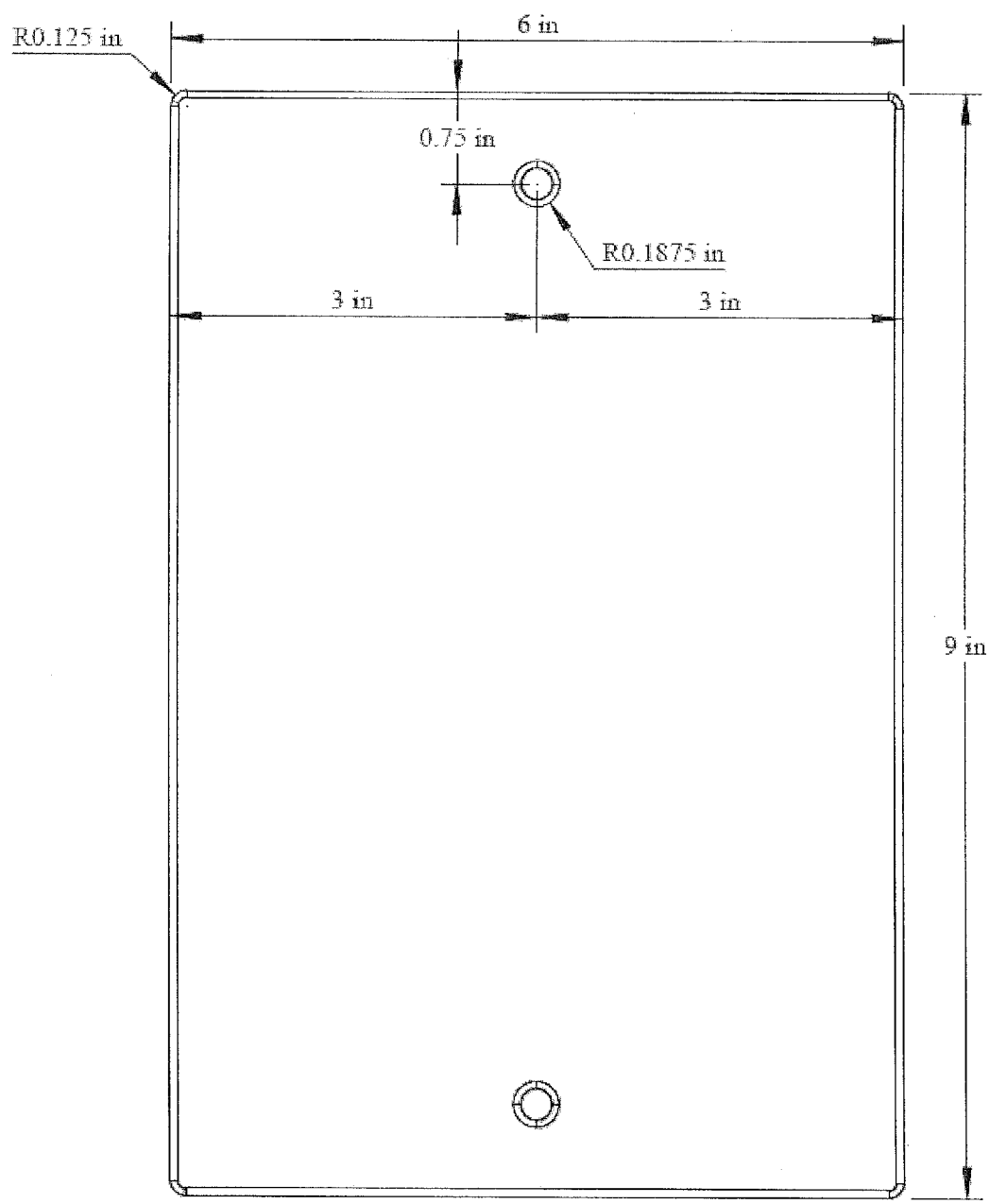

FIG. 47 illustrates a top view of an example extension plate.

Figure 48:
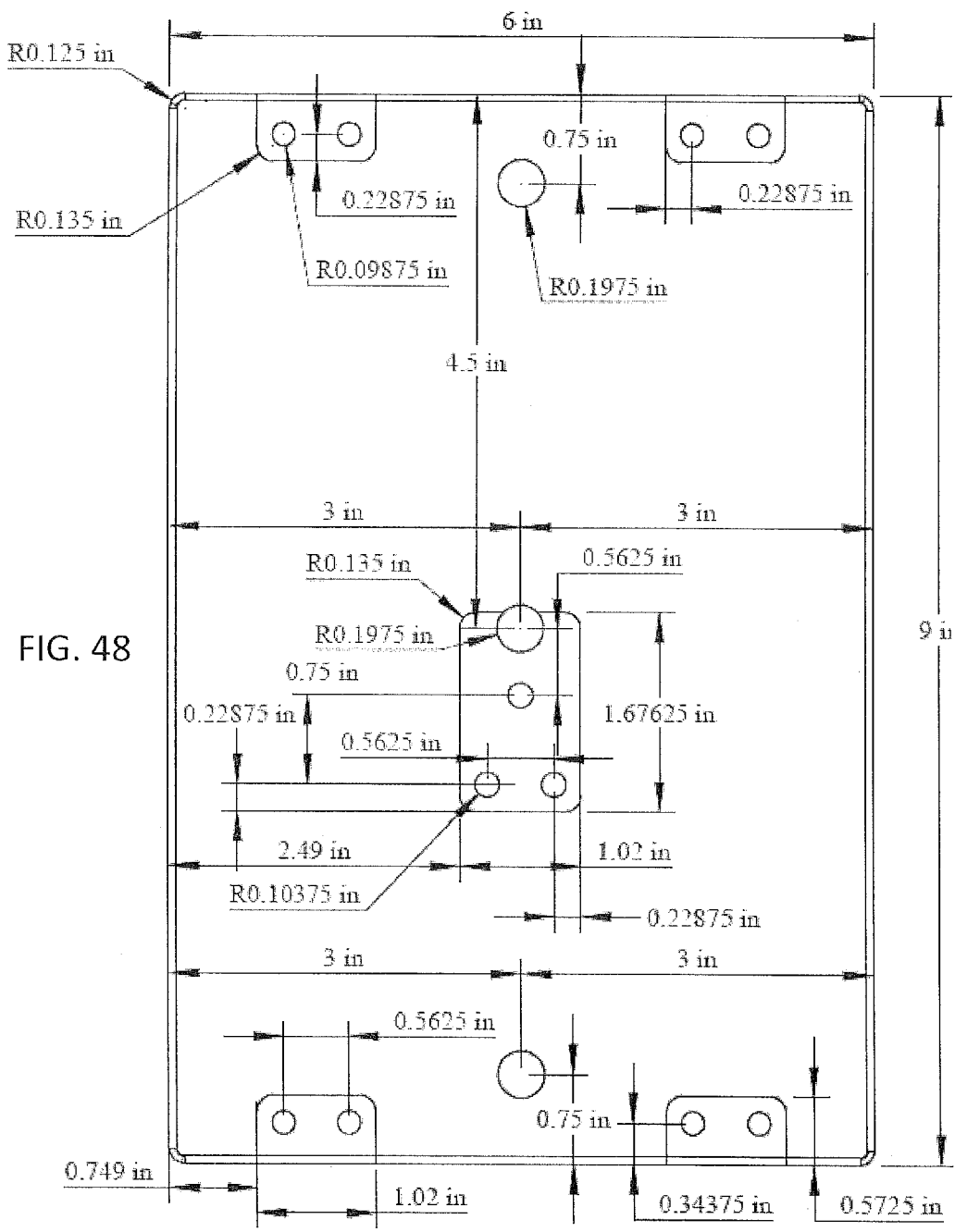
Figure 49:
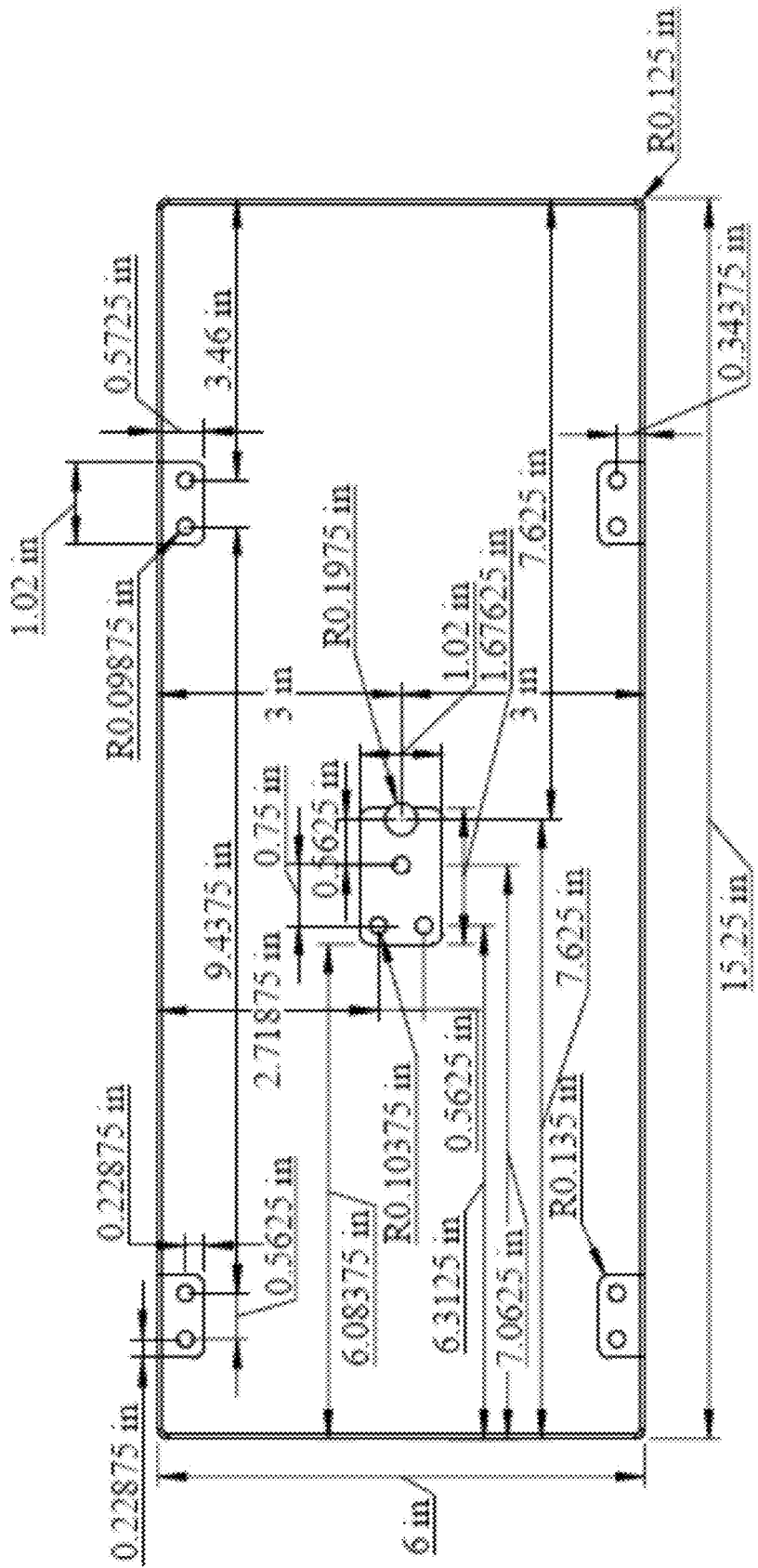

FIGS. 48 and 49 illustrate example bottom views of an example extension plates.

Figure 50:
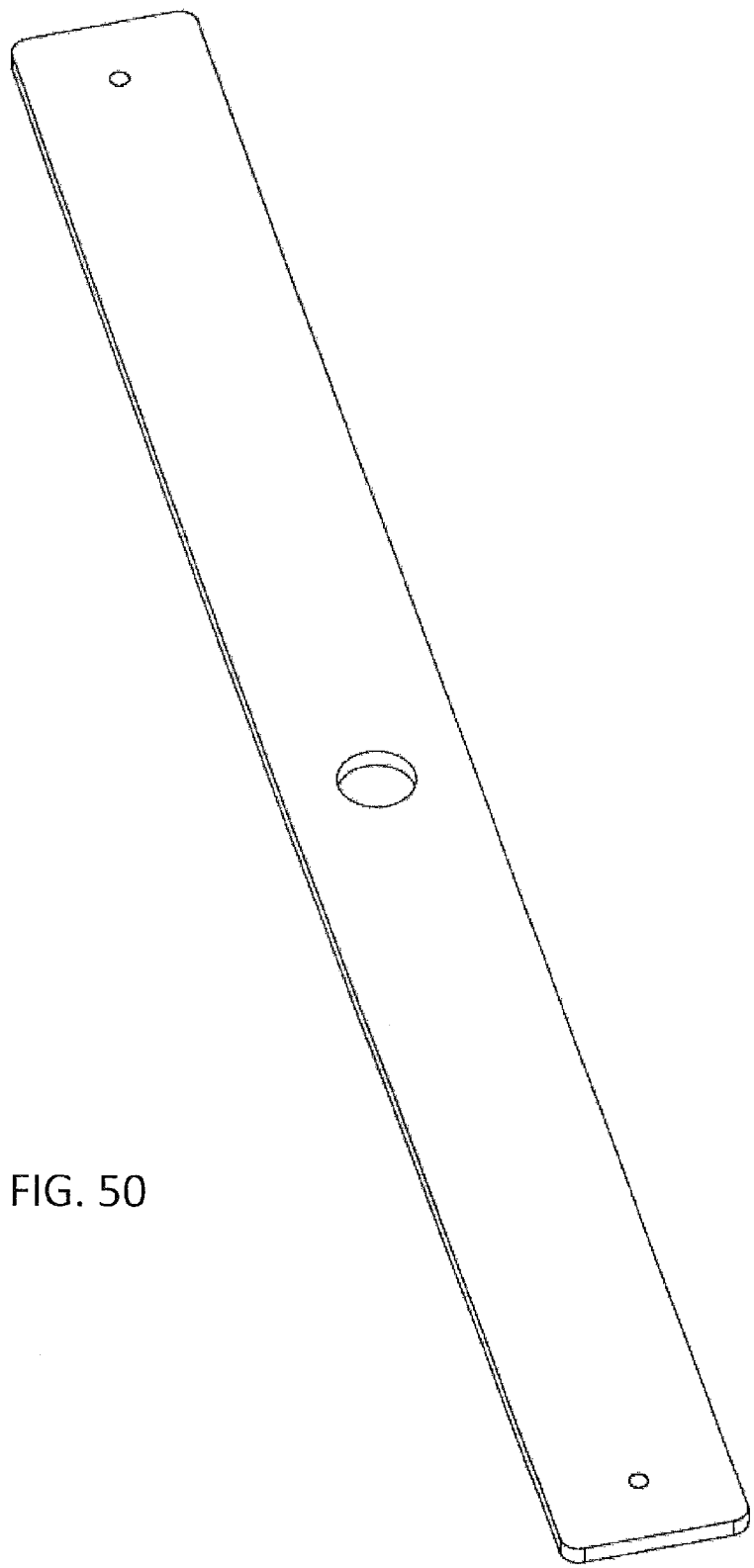

FIG. 50 illustrates a perspective view of an example tool centering guide.

Figure 51:

FIG. 51 illustrates a side view of an example tool centering guide.

Figure 52:
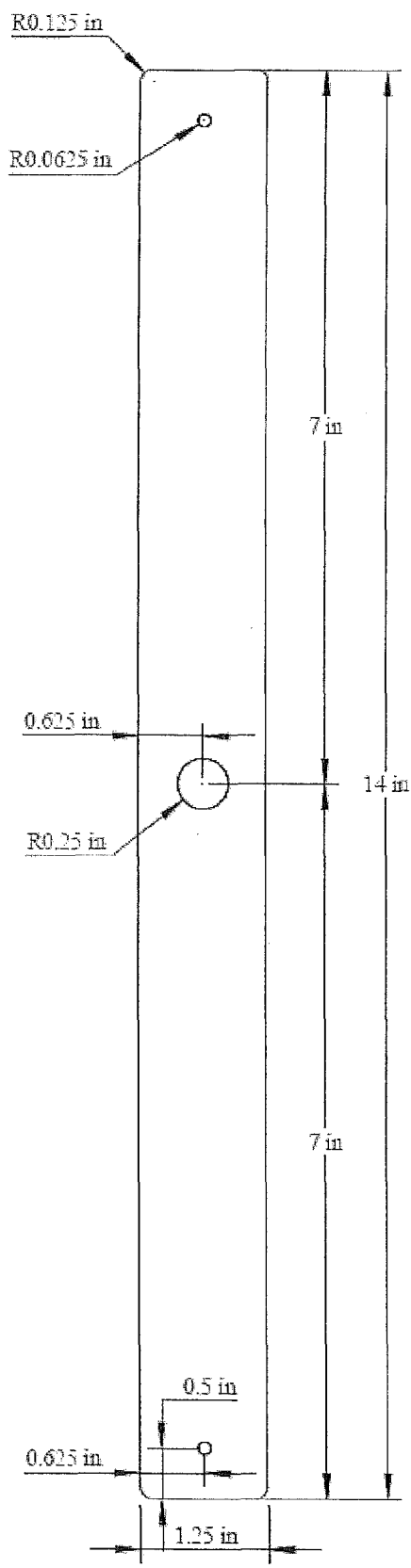

FIG. 52 illustrates a top view of an example tool centering guide.

Figure 53:
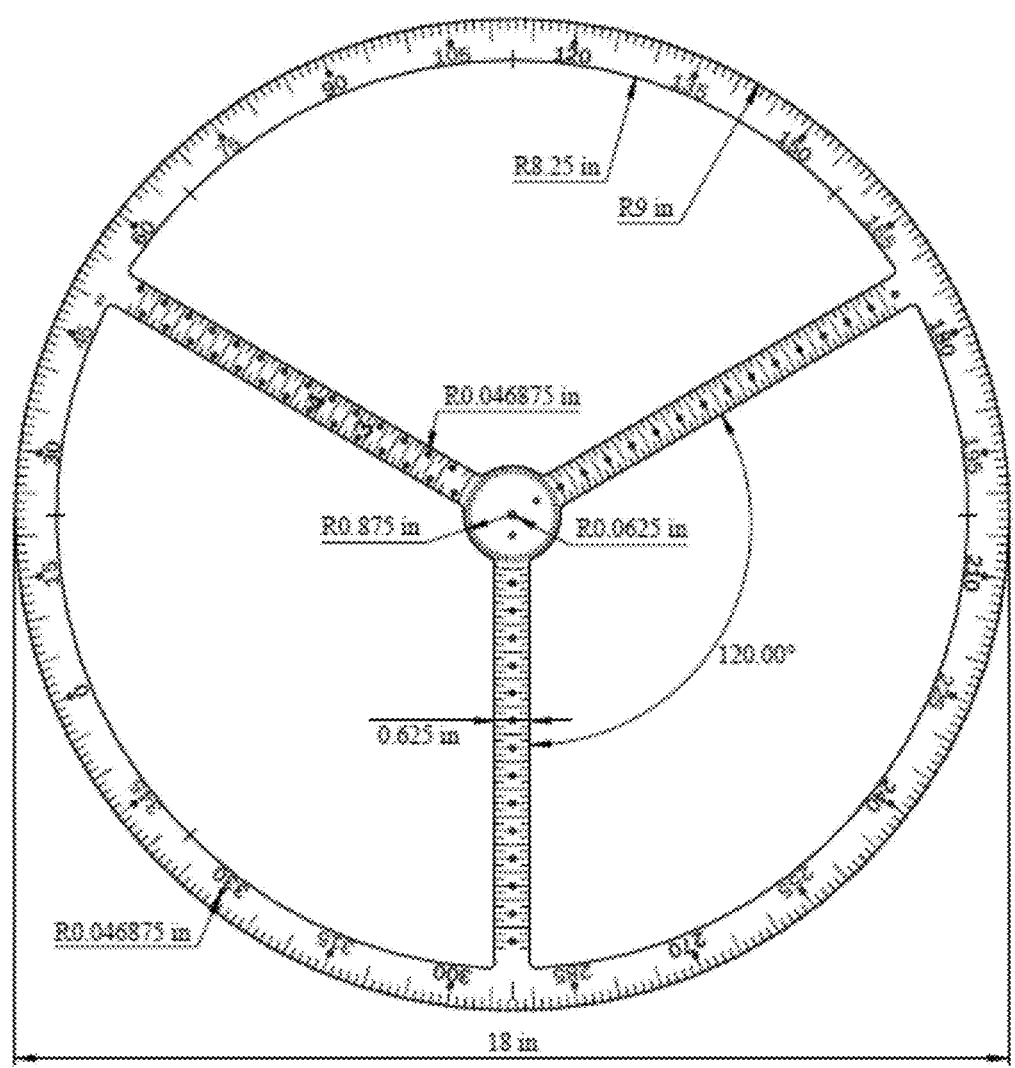

FIG. 53 illustrates an example degree scale.

Figure 54:
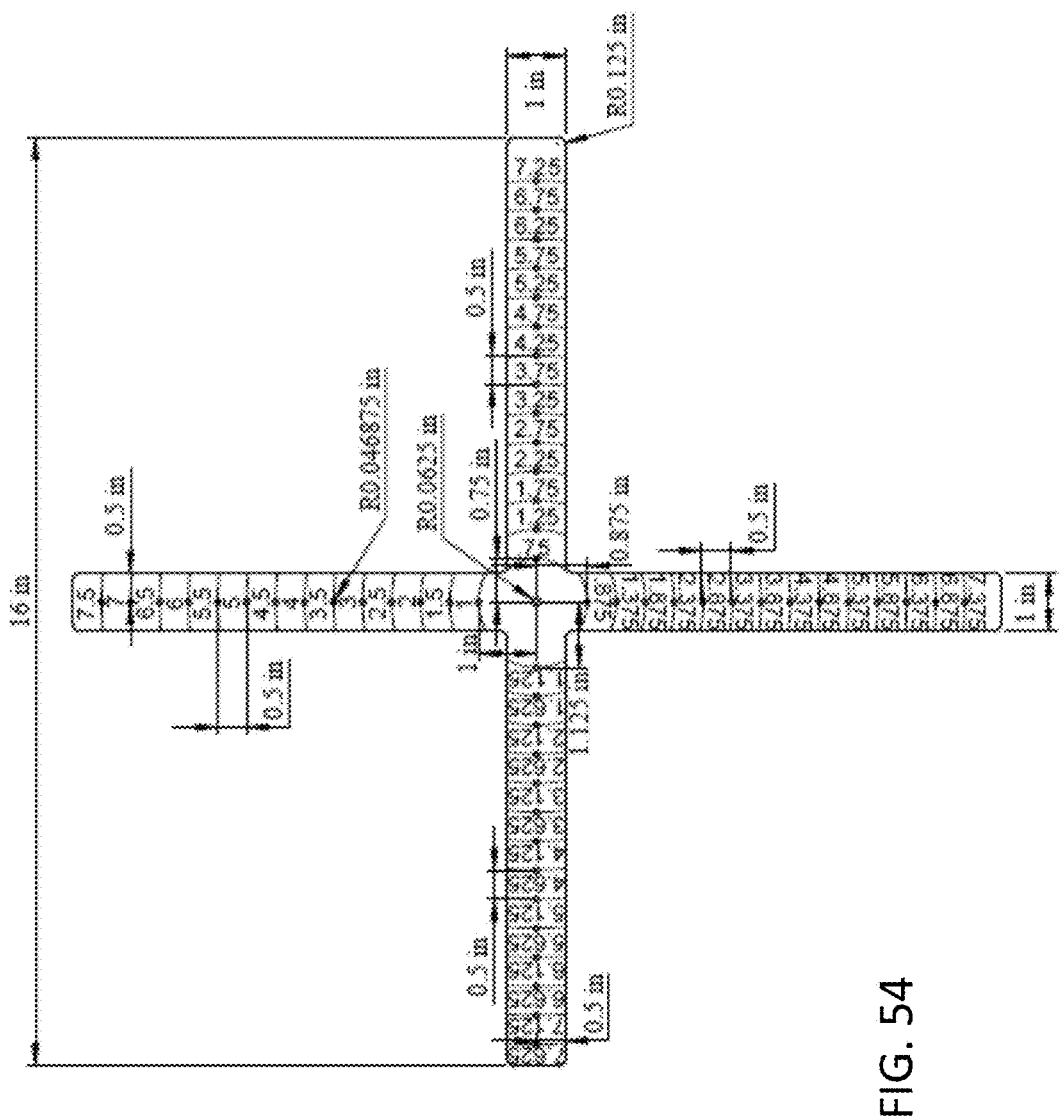

FIG. 54 illustrates an example holding cross.

Figure 55:
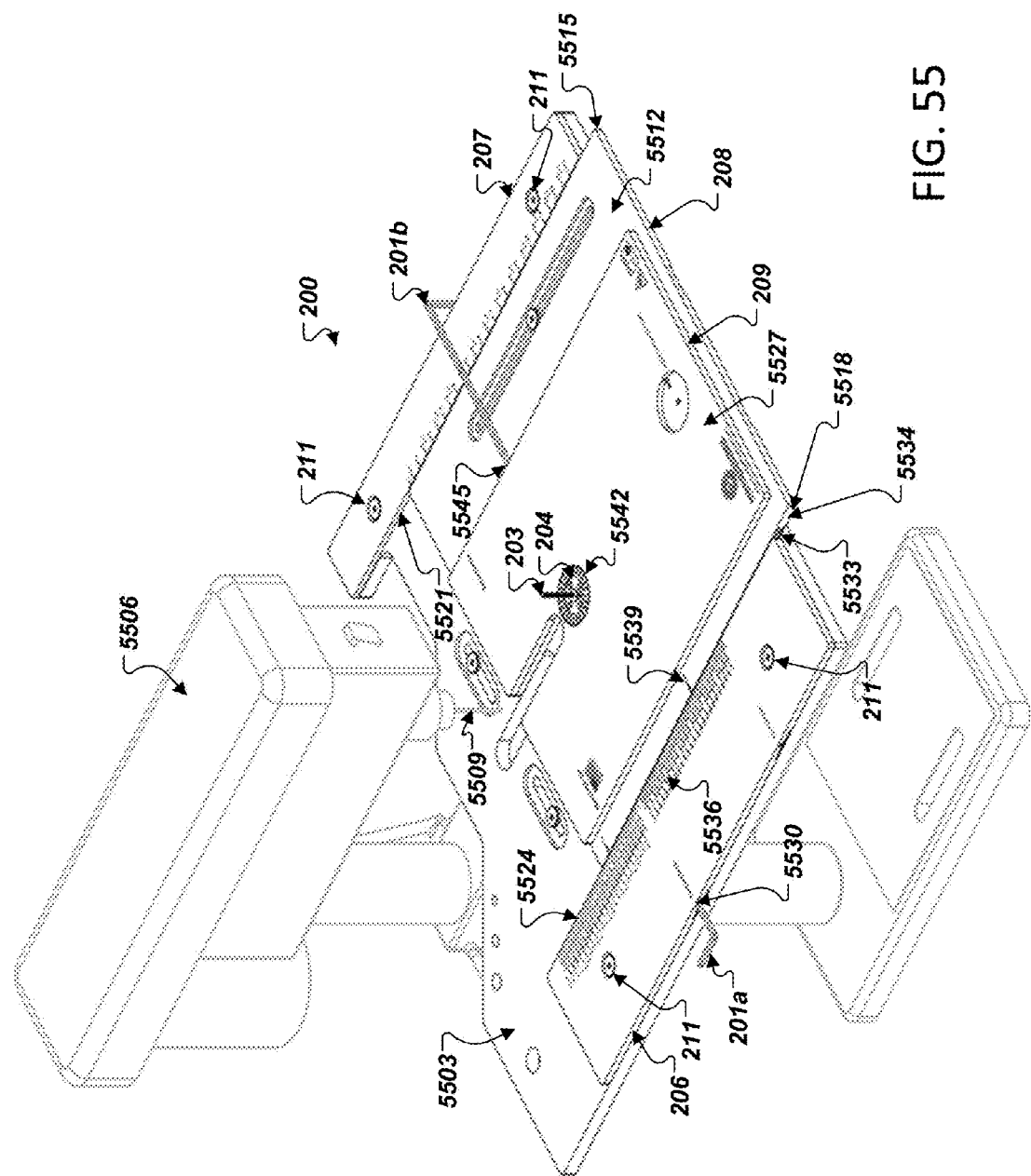

FIG. 55 illustrates a perspective view of an example drill press circular pattern tool.

Figure 56:
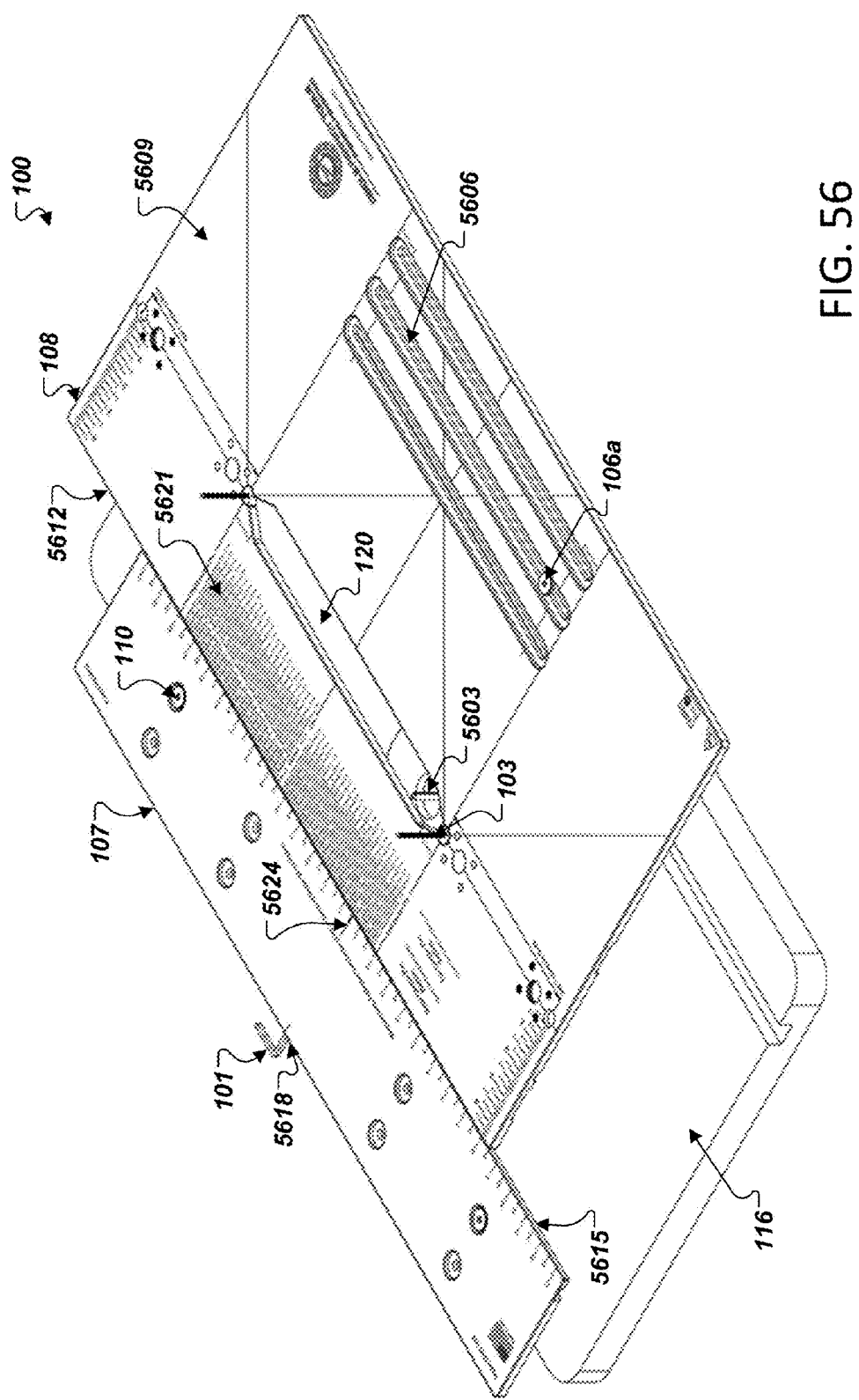

FIG. 56 illustrates a perspective view of an example router circle cutting tool.

DETAILED DESCRIPTION OF THE INVENTION

Presently, without expensive computerized machinery, an operator cannot cut arcs or circles into the face of a work piece or drill holes into a work piece in an arc or circular pattern in increments of degrees. Two inventions are presented to solve these problems. In the first invention a router circle cutter is explained. This device can be used to cut arcs and circles into face of a work piece such as wood and plastic with precision. This invention is used in conjunction with a routing table and router.

In the second invention a drill press tool is explained. This device can be used to easily drill holes in a precise small or large circular pattern in increments of degrees of arc in the work piece, such as wood, plastic or metal, also operator can recall precise drilling positions using a drill press.

Turning to the Router Circle Cutter tool 100, to assemble the device, an operator starts with a traditional router, which comprises a routing table 116 as is well known in the art. Referring to FIG. 1, once the Alignment Plate 107 is securely attached to the Router Table 116, the Slide Plate 108 can slide side to side on the Router Table 116. The Slide Plate 108 has a routing slot 120, which allows the router bit to protrude up through the Slide Plate 108. The work piece is lowered onto the work piece-receiving pin 103 using a pre-drilled hole in the work piece. The work piece can then be rotated around the work piece-receiving pin 103 to precisely route groves in an arc or circular pattern from 0 to 360 degrees. The Slide Plate 108 can be moved side to side in very small increments from the center of the Router Bit and can be locked into position by the radius-setting pin 101.

To use this tool, referring to FIG. 1, operator securely attaches the Alignment Plate 107 by using the Alignment Plate Table Mounting Brackets 109 or by using machine bolts, washers and nuts. Once the Alignment Plate 107 is attached to a Router Table 116, the user now positions the Slide Plate 108 and the Slide Plate Brackets 105 into the groove of the Alignment Plate 107. This allows the Slide Plate 108 to slide side to side over the router bit. Operator now lowers the work piece to be routed down onto the work piece-receiving pin 103 using a pre-drilled hole in the work piece. Operator will guide the Slide Plate 108 into the desired position by lining up the notch on the Alignment Plate 107 with the measurement scale printed on the Slide Plate 108 to locate the correct measurement and then use the radius-setting pin 101 to lock in desired position of the Slide Plate 108. The stationary rod nut 106b is now used to lock down the Slide Plate 108 to Router Table 116. An operator will then turn on the router attached to the Router Table 116 and lower the work piece down onto the work piece-receiving pin 103 using a pre-drilled hole in the work piece. At this point, the operator is ready to plunge and rotate the work piece on the router bit from 0-360 degrees in order to In some embodiments the following items can be added to improve accuracy, speed, and allow for new capabilities and increase system performance or efficiency: Centering Pin Bushings (15), a stationary rod-receiving bracket 104 for the Router Table 116 top, and a Holding Cross (12). The Centering Pin Bushings (15) provide smoother operation during rotation and/or plunging. Centering Pin Bushings (15) also allow re-use on center point on pre-drilled holes in work pieces so center point can be recalled after a bigger hole has been drilled. Stationary rod-receiving bracket 104 allows the fully assembled circle cutter to be used on a wider range of router tables based different sizes. The Holding Cross (12) holds a single piece of a work piece in order to allow operator to create a core and shell by cutting completely through the work piece.

Turning to the second invention, the Drill Press Circular Pattern tool 200, to assemble device, an operator starts with a traditional drill press as is well known in the art. Referring to FIG. 2, once the second alignment plate 206 and first alignment plate 207 are securely attached to the Table Mount 210, the Slide Plate 208 can slide back and forth on the Table Mount 210 between the second alignment plate 206 and first alignment plate 207. The Slide Plate 208 and Rotation Plate 209 have a slot, which allows the drill bit to protrude down through the Slide Plate 208 and the Rotation Plate 209 as well as Table Mount 210. The work piece is lowered onto the work piece-receiving pin 203 using a pre-drilled hole in the work piece. The work piece can then be rotated around the work piece-receiving pin 203 to precisely drill holes in circular patterns from 0 to 360 degrees. Rotation Plate 209 and Slide Plate 208 can be moved back and forth in very small increments from the center of the drill bit and can be locked into position by the radius-fixing pin(s) 201a. The work piece can be rotated on the Rotation Plate 209 from 0-360 degrees and locked into position using the angle-fixing pin 201b of the Rotation Plate 209.

To use the tool, referring to FIG. 2, an operator securely mounts the Table Mount 210 using Mounting Bolts, Washers, and Nuts 211 to the drill press table. Once the second alignment plate 206 and first alignment plate 207 are attached to the Table Mount 210, the operator now positions the Slide Plate 208 between the second alignment plate 206 and first alignment plate 207. This allows the Slide Plate 208 to slide back and forth under the drill bit. Operator now lowers the work piece to be drilled down onto the work piece-receiving pin 203 using a pre-drilled hole in the work piece. Operator will guide the Slide Plate 208 into the desired position using scale printed on the second alignment plate 206 to locate the correct measurement and then use the radius-fixing pin 201a to lock in desired position of the Slide Plate 208. The Lock Down bolt/nut 205 is now used to lock down the Slide Plate 208 to Table Mount 210. At this point the operator is ready to drill then rotate the work piece and drill again from 0-360 degrees in order to drill holes in arcs or circles patterns.

In other embodiments, instead of using a drill bit to cut the work piece while the work piece is being rotated around the work piece-receiving pin 203, an operator can use an ink pen to draw circles on material with precision and recall ability. The drill press tool 200 simply allows rotating a work piece around a center point which is pre-drilled into the work piece while a protruding component marks or cuts the work piece.

In other embodiments, this invention can produce prototypes with precise arcs and circles cut into work pieces. Professional woodworkers may use this tool to create circular shapes or parts with precision such as a wheel. Artists may use this tool to create artwork with circular patterns.

Both tools use the same Centering Pin and center point concept. Both tools use Alignment Pin(s) to hold tool in precise and repeatable locations of 1/16th inch increments. This allows a work piece to be transferred from one machine tool to another and stay in perfect alignment. For example: Using a 1/4 inch router bit, set at 2 inch radius on router circle cutter you can route a 1/4 inch circular groove 4 inches in diameter on center in a work piece then transfer the work piece to drill press, use 1/4 inch drill bit, set tool at 2 inch radius and drill holes in a circular pattern that precisely fits in 4 inch diameter grove cut by router.

FIG. 55 illustrates a perspective view of an example drill press circular pattern tool 200. The drill press circular pattern tool 200 is mounted on a drill press table 5503 of a drill press 5506. The drill press 5503 includes a drill bit 5509 that an operator of the drill press 5506 may use to drill a hole into a work piece that is placed on the drill press table 5503.

The drill press circular pattern tool 200 is the tool assembled from the various parts illustrated in FIG. 2. The second alignment plate 206 and the first alignment plate 207 are fastened to the drill press table using the mounting bolts, nuts and washers 211. The second alignment plate 206 and the first alignment plate 207 define an area for the slide plate 208 to slide linearly. The operator may slide the slide plate 208 towards or away from the drill bit 5509 depending on the radius of the arc that the operator wants to drill in the work piece.

The slide plate 208 is a thin plate that includes a work face 5512. The work face 5512 is the side of the slide plate 208 that faces the operator. The side of the slide plate 208 that is opposite the work face 5512 contacts the drill press table 5503. The work face 5512 defines a work plane that is parallel to the drill press table 5503. On each side of the slide plate 208 are a first alignment plate-abutting face 5515 and a second alignment plate-abutting face 5518. The first alignment plate-abutting face 5515 abuts the slide plate-abutting face 5521 of the first alignment plate 207. As an operator slides the slide plate 208 back and forth, the first alignment plate-abutting face 5515 and the slide plate-abutting face 5521 rub against each other. The second alignment plate-abutting face 5518 is on a side opposite first alignment plate-abutting face 5515. The second alignment plate-abutting face 5518 abuts the slide plate-abutting face 5524 of the second alignment plate 208. As an operator slides the slide plate 208 back and forth, the second alignment plate-abutting face 5518 and the slide plate-abutting face 5524 rub against each other.

On top of the slide plate 208 is a rotation plate 209. Like the slide plate 208, the rotation plate 209 is a thin plate. The rotation plate 209 includes a work face 5527 that faces the operator and that is parallel to the work face 5512 and the work plane. The side of the rotation plate 209 that is opposite the work face 5512 is the slide plate-abutting face. The slide plate-abutting face abuts the work face 5512. The rotation plate 209 slides with the slide plate 208 as the operator slides the slide plate 208.

To lock the slide plate 208 into place in preparation for drilling holes, the operator engages the radius-fixing pin 201a with the second alignment plate-abutting face 5518. The second alignment plate 206 includes a through hole 5530 through which the radius-fixing pin 201a slides. While the radius-fixing pin 201a is disengaged from the second alignment plate-abutting face 5518, the slide plate 208 can slide linearly between the first alignment plate 207 and the second alignment plate 206. For the radius-fixing pin 201a to engage the second alignment plate-abutting face 5518, the second alignment plate-abutting face 5518 includes a toothed portion 5533. The toothed portion 5533 includes ridges that are configured to receive the radius-fixing pin 201a. Once radius-fixing pin 201a engages the toothed portion 5533, the slide plate 208 is locked into place. At each end of the second alignment plate-abutting face 5518 is a non-toothed portion 5534 that is smooth and with which the radius-fixing pin 201a cannot engage.

The operator may use the drill press circular pattern tool 200 to drill, in a work piece, a series of equally spaced holes in the shape of an arc. The operator slides the slide plate 208 to align the radius guide 5536 on the second alignment plate 206 with the radius guide marker 5539 on the slide plate 208. Once the radius guide marker 5539 is pointing to the desired radius on the radius guide 5536, the operator slides the radius-fixing pin 201a into the toothed portion 5533 of the second alignment plate 206.

The operator attaches a gear 204 to a work piece. The operator should fasten the gear 204 to a point on the work piece that is the center of the arc that the operator wants to drill into the work piece. The operator selects a gear 204 that corresponds to the desired degree spacing of the drill holes around the arc. For example, a gear 204 with twenty-four teeth is configured to assist the operator in drilling holes every fifteen degrees. A gear 204 with twenty teeth may assist in drilling holes every eighteen degrees. To attach the work piece and attached gear 204 to the drill press circular pattern tool 200, the operator drills a hole into the center of the work piece. The size of the hole should be about the size of the work piece-receiving pin 203. The operator lowers the work piece and attached gear 204 to be drilled down onto the work piece-receiving pin 203 using the drilled hole in the work piece. The work piece-receiving pin 203 is perpendicular to the work face 5527 of the rotation plate 209 and is located in the center of a circular pocket 5542 that is configured to receive the gear 204 so that the work piece rests flush against the work face 5527.

With the gear 204 attached to the work piece at the center of the desired arc, the operator places the side of the work piece with the gear 204 so that the work piece-receiving pin 203 slides into the center of the hole in the gear 204. Once the work piece is attached to the work piece-receiving pin 203, the operator should be able to spin the work piece around with the work piece-receiving pin 203 being the center point of the rotation. Because the radius-fixing pin 201a is set to the desired radius, the location of the drill bit 5509 should trace a circle on the work piece as the operator spins the work piece.

The operator may use the angle-fixing pin 201b to stop the work piece at fixed angles. Similar to the toothed portion 5533 and the radius-fixing pin 201a, the angle-fixing pin 201b engages with the spaces between the teeth of the gear 204. The angle-fixing pin 201b is inserted into a through hole 5545 of the rotation plate 208. The through hole 5545 extends from a side of the rotation plate to the edge of the circular pocket 5542. With the gear 204 in the circular pocket 5542 and the gear 204 attached to the work piece, the operator can engage the angle-fixing pin 201b with the gear 204, drill a hole, disengage the angle-fixing pin 201b from the gear 204, rotate the approximate number of degrees the work piece about the work piece-receiving pin 203, engage the angle-fixing pin 201b with the gear 204 to make the approximate number of degrees accurate based on the number of teeth of the gear 204, and drill another hole. The operator may continue the drill and rotate sequence until the operator has drilled the desired number of holes.

FIG. 56 illustrates a perspective view of an example router circle cutting tool 100. The router circle cutting tool 100 is mounted on a router table top 116 of a router table. The router table includes a router bit 5603 that an operator of the router table may use to route an arc into a work piece that is placed on the router table.

The router circle cutting tool 100 is the tool assembled from the various parts illustrated in FIG. 1. The alignment plate 107 is fastened to the router table top 116 using the alignment plate mounting bolts and nuts 110. The slide plate 108 is slidably fastened to the router table top 116 using the stationary rod 106a attached to the stationary rod nut 106b through the slide slot 5606 of the slide plate 108. The operator may slide the slide plate 108 linearly along the router table top 106 as restricted by the stationary rod 106a and the alignment plate 107. As the operator slides the slide plate the position of the router bit 5603 within the routing slot 120 changes.

The slide plate 108 is a thin plate that includes a work face 5609. The work face 5608 is the side of the slide plate 108 that faces the operator. The side of the slide plate 108 that is opposite the work face 5609 contacts the router table top 106. The work face 5608 defines a work plane that is parallel to the router table top 106. On one side of the slide plate 108 is an alignment plate-abutting face 5612. The alignment plate-abutting face 5612 abuts the slide plate-abutting face 5615 of the alignment plate 107. As an operator slides the slide plate 108, the alignment plate-abutting face 5612 and the slide plate-abutting face 5612 rub against each other.

To lock the slide plate 108 into place in preparation for routing, the operator engages the radius-setting pin 101 with the alignment plate-abutting face 5612. The alignment plate 107 includes a through hole 5618 through which the radius-setting pin 101 slides. While the radius-setting pin 101 is disengaged from the alignment plate abutting face 5612, the slide plate 108 can slide linearly along a slide axis as guided by the alignment plate 107 and the stationary rod 106a. For the radius-setting pin 101 to engage the alignment plate-abutting face 5612, the alignment plate-abutting face 5612 includes a toothed portion 125 (see FIG. 1). The toothed portion 125 includes ridges that are configured to receive the radius-setting pin 101. Once the radius-setting pin 101 engages the toothed portion 125, the slide plate 108 is locked into place. At each end of the alignment plate-abutting face 5612 is a non-toothed portion 130 (see FIG. 1) that is smooth and with which the radius-setting pin 101 cannot engage.

The operator may use the router circle cutting tool 100 to route, in a work piece, a groove in the shape of an arc. The operator slides the slide plate 108 to align the radius guide 5621 on the slide plate 108 with the radius guide marker 5624 on the alignment plate 107. Once the radius guide marker 5624 is pointing to the desired radius on the radius guide 5621, the operator slides the radius-setting pin 101 into the toothed portion 125 of the slide plate 108.

The operator drills a hole into the work piece at the center of the arc that the operator wants to cut with the router circle cutting tool 100. The size of the hole should be about the size of the work piece-receiving pin 103. The work piece-receiving pin 103 is perpendicular to the work face 5609 of the slide plate 108 and is located at and end of the routing slot 120. The work piece rests flush against the work face 5609 when the work piece is placed on the work piece-receiving pin 103.

With the work piece placed on the work piece-receiving pin 103, the operator should be able to spin the work piece around with the work piece-receiving pin 103 being the center point of the rotation. Because the radius-setting pin 101 is set to the desired radius, the location of the router bit 5603 should trace a circle on the work piece as the operator spins the work piece. The operator turns on the router and the router bit 5603 routes an arc in the work piece as the operator spins the work piece about the work piece-receiving pin 103. In some implementations, the operator turns on the router, places the work piece on the work piece-receiving pin 103, and rotates the work piece about the work piece-receiving pin 103.

That which is claimed:

1. A tool for drilling holes in a work piece, along a curve the tool comprising:
   a radius-fixing pin;
   an angle-fixing pin;
   a slide plate that (i) includes a work face that defines a work plane, (ii) includes a second alignment plate-abutting face that is substantially perpendicular to the work plane, is disposed on along one side of the slide plate, and includes a non-toothed portion and a toothed portion with which the radius-fixing pin engages, and (iii) includes a first alignment plate-abutting face that is substantially perpendicular to the work face and is disposed on an opposite side of the slide plate as the second alignment plate-abutting face;
   a first alignment plate that includes a slide plate-abutting face that is substantially perpendicular to the work plane and abuts the first alignment plate-abutting face;
   a second alignment plate that (i) includes a slide plate-abutting face that is substantially perpendicular to the work plane and abuts the non-toothed portion of the second alignment plate-abutting face and (ii) includes a through hole through which the radius-fixing pin is inserted, wherein the slide plate abutting-face of the first alignment plate and the slide plate abutting-face of the second alignment plate constrain the slide plate to slide along a slide axis that is substantially parallel to the work plane;
   a rotation plate that (i) includes a work face that is substantially parallel to the work plane and is disposed along one side of the rotation plate, (ii) includes a slide plate-abutting face that is substantially parallel to the work plane, abuts the work face of the slide plate, and is disposed on an opposite side of the rotation plate as the work face of the rotation plate, (iii) includes a circular pocket on the work face of the rotation plate, and (iv) includes a through hole through which the angle-fixing pin is inserted and that intersects the circular pocket;
   a work piece-receiving pin that (i) is substantially perpendicular to the work plane and (ii) is substantially centered in the circular pocket; and
   a gear that (i) is attached to the work piece and (ii) includes a predefined number of teeth at predefined angles, wherein the circular pocket is configured to receive the gear and the gear is configured to receive the angle-fixing pin.

2. The tool of claim 1, comprising:
   an additional radius-fixing pin,
   wherein:
   the additional radius-fixing pin engages the toothed portion of the second alignment plate-abutting face of the slide plate, and
   the second alignment plate includes an additional through hole through which the additional radius-fixing pin is inserted.

3. The tool of claim 1, wherein:
the toothed portion of the alignment plate-abutting face of the slide plate comprises substantially equally spaced slots.

4. The tool of claim 1, wherein:
the curve comprises an arc, and
the work piece-receiving pin is provided at a center of the arc.

5. The tool of claim 4, wherein:
the second alignment plate includes measurements that indicate a radius of the arc.

6. The tool of claim 1, comprising:
a radius-fixing pin cover that (i) covers the through hole through which the radius-fixing pin is inserted and (ii) is substantially flush with a radius-fixing pin cover-receiving face of the second alignment plate that is substantially parallel to the work plane;
an angle-fixing pin cover that (i) covers the through hole through which the angle-fixing pin is inserted and (ii) is substantially flush with the slide plate-abutting face.

7. The tool of claim 1, wherein the rotation plate slides along the slide axis with the slide plate.

8. The tool of claim 1, wherein:
the non-toothed portion of the second alignment plate-abutting face of the slide plate is provided in two portions, each at an opposite end of the second alignment plate-abutting face, and
the toothed portion of the second alignment plate-abutting face of the slide plate is provided between the two portions of the non-toothed portion of the second alignment plate-abutting face of the slide plate.

9. The tool of claim 1, wherein the through hole through which the radius-fixing pin is inserted is substantially perpendicular to the slide plate-abutting face of the second alignment plate.

10. The tool of claim 1, wherein the through hole through which the radius-fixing pin is inserted is substantially perpendicular a radius-fixing pin-receiving face that is substantially perpendicular to the work plane.

11. A tool for cutting in a work piece, along a curve, the tool comprising:
a radius-setting pin;
a stationary rod;
a slide plate that (i) includes a work face that defines a work plane, (ii) includes an alignment plate-abutting face that is substantially perpendicular to the work plane, is disposed on along one side of the slide plate, and includes a non-toothed portion and a toothed portion with which the radius-fixing pin engages, (iii) includes a slide slot through which the stationary rod is inserted and that is substantially parallel to the alignment plate-abutting face, (iv) includes a routing slot through which a router bit is inserted and that is substantially parallel to the slide slot;
an alignment plate that (i) includes a slide plate-abutting face that is substantially perpendicular to the work plane and abuts the non-toothed portion of the alignment plate-abutting face and (ii) includes a through hole for through which the radius-setting pin is inserted, wherein the stationary rod and the slide plate-abutting face constrain the slide plate to slide along a slide axis that is substantially parallel to the work plane; and
a work piece-receiving pin that is substantially perpendicular to the work plane and is provided at an end of the routing slot.

12. The tool of claim 11, wherein:
the toothed portion of the alignment plate-abutting face of the slide plate comprises substantially equally spaced slots.

13. The tool of claim 11, wherein:
the curve comprises an arc, and
the work piece-receiving pin is provided at a center of the arc.

14. The tool of claim 13, wherein:
the slide plate includes measurements that indicate a radius of the arc.

15. The tool of claim 11, comprising:
a radius-fixing pin cover that (i) covers the through hole through which the radius-fixing pin is inserted and (ii) is substantially flush with a radius-fixing pin cover-receiving face of the alignment plate that is substantially parallel to the work plane.

16. The tool of claim 11, wherein:
the non-toothed portion of the alignment plate-abutting face of the slide plate is provided in two portions, each at an opposite end of the alignment plate-abutting face, and
the toothed portion of the alignment plate-abutting face of the slide plate is provided between the two portions of the non-toothed portion of the alignment plate-abutting face of the slide plate.

17. The tool of claim 11, wherein the through hole through which the radius-fixing pin is inserted is substantially perpendicular to the slide plate-abutting face of the alignment plate.

18. The tool of claim 11, wherein the stationary rod it substantially perpendicular to the work plane.

19. The tool of claim 11, wherein the alignment plate includes a work face that is parallel to the work plane.

20. The tool of claim 11, comprising:
a stationary rod-receiving bracket with which the stationary rod engages and that attaches to a work table.

\* \* \* \* \*